United States Patent
Nishira et al.

(10) Patent No.: US 7,085,633 B2
(45) Date of Patent: Aug. 1, 2006

(54) SYSTEM AND METHOD FOR IMPROVING VEHICLE OPERATOR DRIVING ASSISTANCE OF AUTOMOTIVE VEHICLE

(75) Inventors: Hikaru Nishira, Kanagawa (JP); Taketoshi Kawabe, Yokohama (JP)

(73) Assignee: Nissan Motor Co., Ltd., Kanagawa-Ken (JP)

(*) Notice: Subject to any disclaimer, the term of this patent is extended or adjusted under 35 U.S.C. 154(b) by 76 days.

(21) Appl. No.: 10/703,548

(22) Filed: Nov. 10, 2003

(65) Prior Publication Data
US 2004/0107030 A1 Jun. 3, 2004

(30) Foreign Application Priority Data
Nov. 21, 2002 (JP) ............... 2002-338289

(51) Int. Cl.
*G06F 7/00* (2006.01)
(52) U.S. Cl. .......... 701/36; 701/96; 701/302; 348/148; 340/436; 180/167
(58) Field of Classification Search ........... 701/36, 701/96, 301–302; 340/435, 436; 180/167–170; 348/148
See application file for complete search history.

(56) References Cited

U.S. PATENT DOCUMENTS

| | | | |
|---|---|---|---|
| 5,617,085 A | 4/1997 | Tsutsumi et al. | |
| 5,765,116 A | 6/1998 | Wilson-Jones et al. | |
| 6,026,347 A | 2/2000 | Schuster | |
| 6,107,939 A * | 8/2000 | Sorden | 340/901 |

FOREIGN PATENT DOCUMENTS

| | | |
|---|---|---|
| JP | 7-104850 | 4/1995 |
| JP | 7-277041 | 10/1995 |
| JP | 9-142236 | 6/1997 |
| JP | 10-211886 | 8/1998 |
| JP | P2000-108721 A | 4/2000 |
| JP | P2001-52297 A | 2/2001 |

OTHER PUBLICATIONS

Toshiuyuki Ohtsuka Continuation/GMRES Method for Fast Algorithm of Nonlinear Receding Horizon Control, in Proceedings of the 39-th IEEE conference on Decision and Control, pp. 766-771, no date.
A Japanese Book called "Engineering Optimum Control—approach to non-linearity" authored by Kanichirou KATOU published by Tokyo University Publishing Society on Feb. 10, 1991 (first version on Apr. 15, 1988).

* cited by examiner

*Primary Examiner*—Yonel Beaulieu
(74) *Attorney, Agent, or Firm*—McDermott Will & Emery LLP

(57) ABSTRACT

In system and method for improving operator driving assistance of an automotive vehicle, at an indication of acceleration timing and magnitude and the lane change timing, a lane change necessity is calculated and a lane change trigger signal is produced while the host vehicle is operated on a road that has at least three lanes and, at the calculation of the lane change necessity and at the production of the lane change signal, a new lane change trigger signal is prohibited to indicate until a forward lane change operation is deemed to be completed, in a case where the vehicle is traveling on a multiple number traffic lane road.

17 Claims, 15 Drawing Sheets

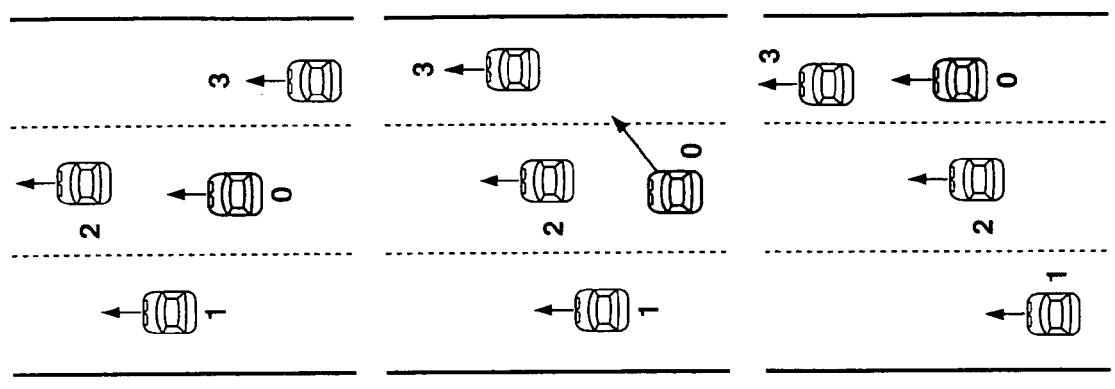
FIG.4C
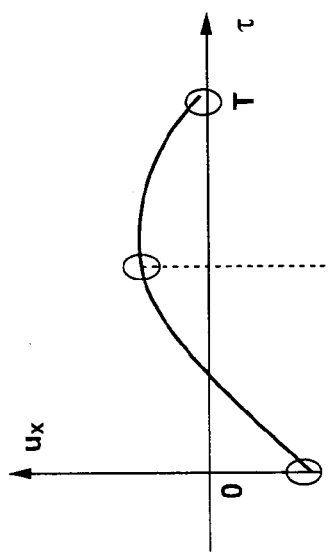
FIG.4A LONGITUDINAL RECOMMENDED CONTROL INPUT
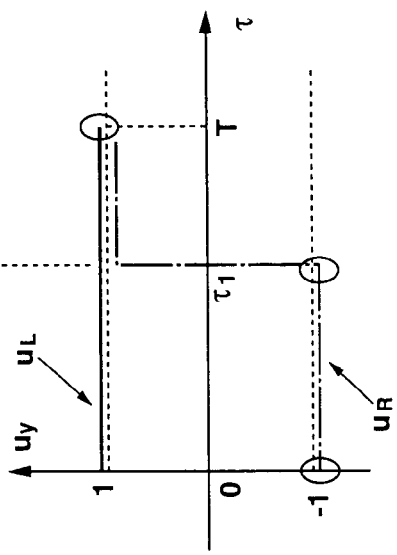
FIG.4B TRAFFIC LANE CHANGE TRIGGER SIGNAL

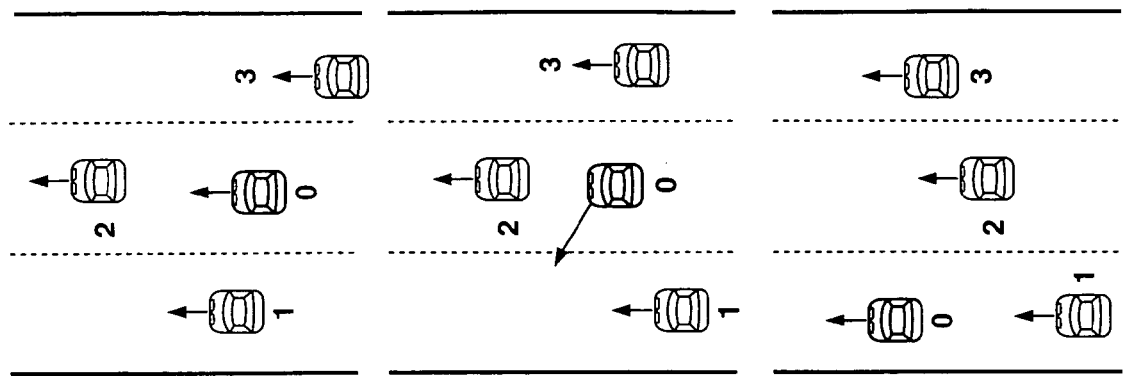
FIG.5C
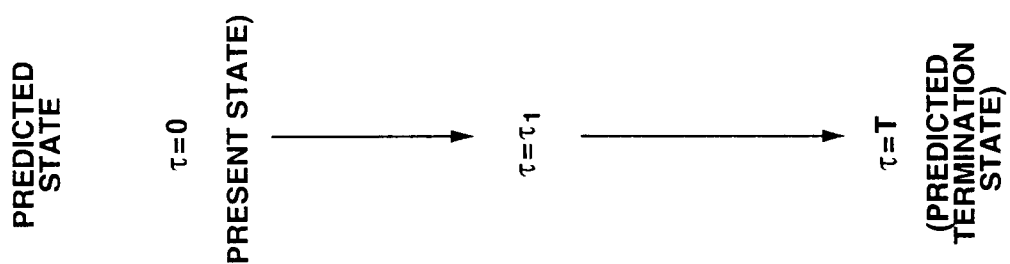
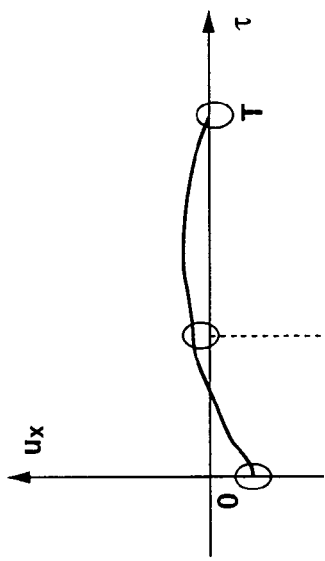
FIG.5A  LONGITUDINAL RECOMMENDED CONTROL INPUT
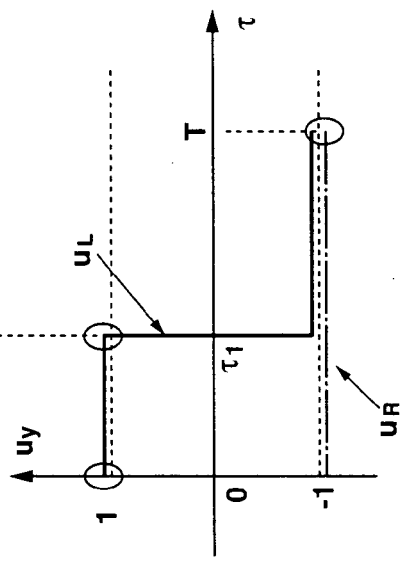
FIG.5B  TRAFFIC LANE CHANGE TRIGGER SIGNAL

INITIAL STATE τ=0
CASE 1

RECOMMENDED CONTROL INPUT

PREDICTED TERMINATION STATE τ=T

τ=0
CASE 2

τ=T

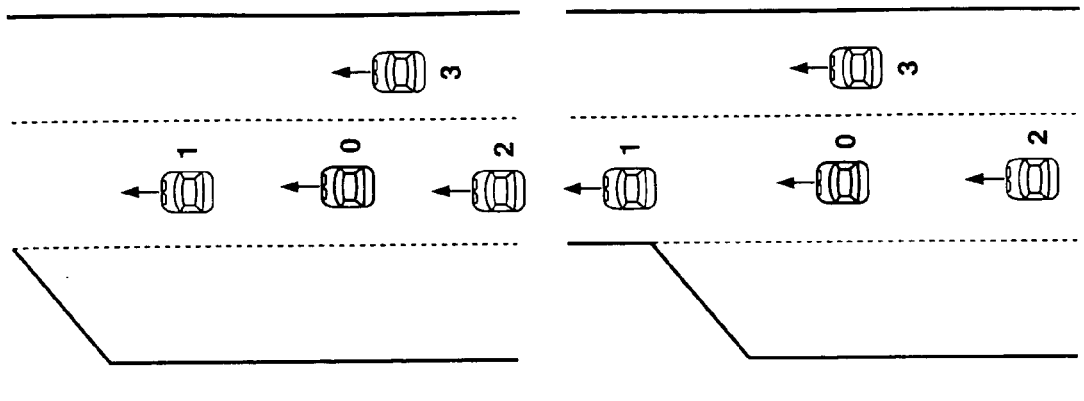
FIG.12C
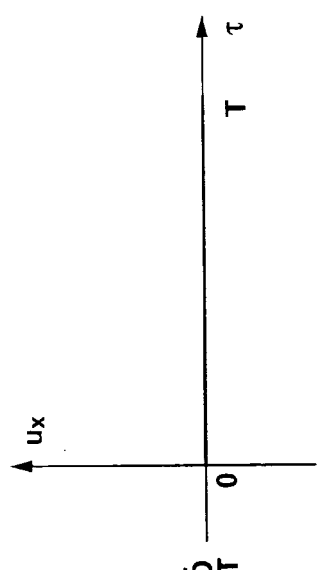
FIG.12A LONGITUDINAL RECOMMENDED CONTROL INPUT
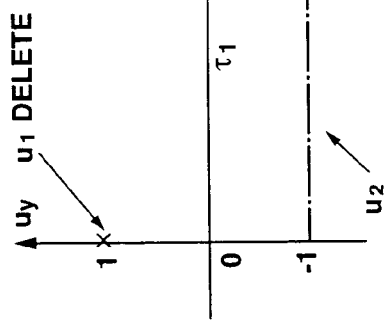
FIG.12B TRAFFIC LANE CHANGE TRIGGER SIGNAL

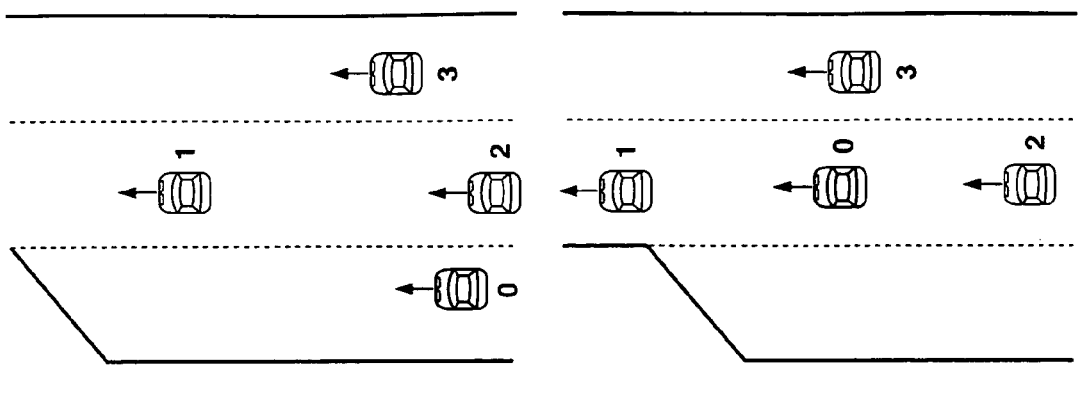
FIG.15C
PREDICTED STATE
$\tau=0$
(PRESENT STATE)
$\tau=T$
(PREDICTED TERMINATION STATE)
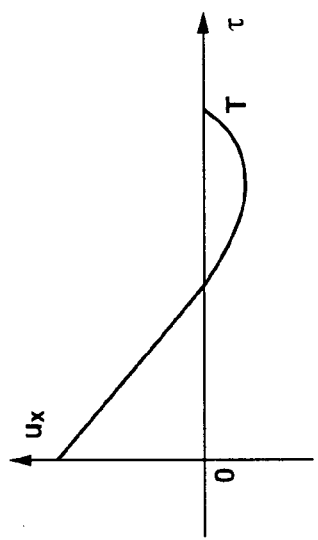
FIG.15A LONGITUDINAL RECOMMENDED CONTROL INPUT
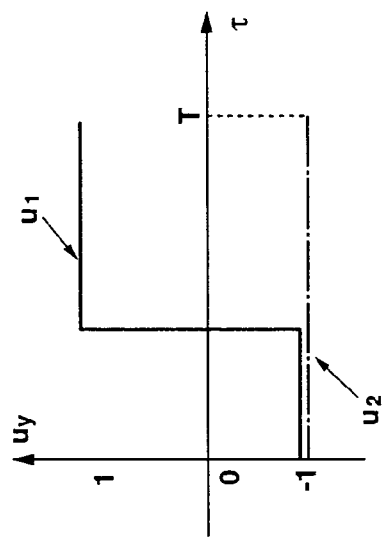
FIG.15B TRAFFIC LANE CHANGE TRIGGER SIGNAL

SYSTEM AND METHOD FOR IMPROVING VEHICLE OPERATOR DRIVING ASSISTANCE OF AUTOMOTIVE VEHICLE

BACKGROUND OF THE INVENTION

1. Field of the Invention

The present invention relates to system and method for improving vehicle operator (driver's) driving assistance of an automotive vehicle.

2. Description of the Related Art

There are many patent applications regarding previously proposed vehicle operator driving assistance systems to assist the vehicle driver's driving. A Japanese Patent Application First Publication No. Heisei 10-211886 published on Aug. 11, 1998 exemplifies a previously proposed vehicle operator driving assistance improving system. In the previously proposed vehicle operator driving assistance improving system disclosed in the above-described Japanese Patent Application First Publication, a potential risk magnitude (so-called, a risk potential) is defined on the basis of a relative movement state with each of surrounding vehicles (obstacles inclusive) and a value of an assistance torque to a vehicular steering system or steering reaction force is adjusted on the basis of a value of the calculated risk potential. Such a vehicular driving assistance system as described above can be considered to be aimed at suppressing a risky driving operation in a case where the driver (or operator) tries to operate a vehicular component (a steering wheel), this driving operation being such that it is predicted that a risk will be involved.

SUMMARY OF THE INVENTION

However, the previously proposed driver's driving assistance improving system simply traces the value of the risk potential, a systematic prediction is not considered to be inserted into the driving operation, and, thus, a timing at which the vehicle makes a traffic lane change on which the vehicle is traveling cannot be produced to the driver.

It is, hence, an object of the present invention to provide system and method for improving vehicle operator driving assistance of an automotive vehicle which are capable of producing to the vehicle driver (or vehicle operator) a timing at which the vehicle favorably makes a traffic lane change to another lane on which the vehicle is to travel.

The above-described object can be achieved by providing a system for improving vehicle operator driving assistance of an automotive vehicle, the system comprising: a surrounding vehicle sensor that detects other surrounding vehicle conditions; a host vehicle condition sensor that detects the host vehicle own conditions; a lane sensor that detects positions and numbers of forward lanes; a surrounding vehicle motion predictor that predicts future movements of the surrounding vehicle; an evaluation function calculator that calculates a desirableness of a vehicle operator's driving operation; a recommended operation indicator that indicates acceleration timing and magnitude and a lane change timing with a desirable lane for the host vehicle from outputs of the surrounding vehicle motion predictor and the evaluation function calculator; wherein the recommended operation indicator calculates a lane change necessity and produces a lane change trigger signal while the host vehicle is operated on a road that has at least three lanes; and wherein the recommended operation indicator also prohibits to indicate a new lane change trigger signal until a forward lane change operation is deemed to be completed.

The above-described object can also be achieved by providing a method for improving vehicle operator driving assistance of an automotive vehicle, the method comprising: detecting other surrounding vehicle conditions; detecting the host vehicle own conditions; detecting positions and numbers of forward lanes; predicting movements of the surrounding vehicles; calculating a desirableness of a vehicle operator's driving operation; indicating acceleration timing and magnitude and a lane change timing with a desirable lane for the host vehicle from outputs at the prediction of the future movements of the surrounding vehicles and at the evaluation function calculation; wherein, at the indication of the acceleration timing and magnitude and the lane change timing, a lane change necessity is calculated and a lane change trigger signal is produced while the host vehicle is operated on a road that has at least three lanes and wherein, at the calculation of the lane change necessity and at the production of the lane change signal, a new lane change trigger signal is indicated until a forward lane change operation is deemed to be completed.

This summary of the invention does not necessarily describe all necessary features so that the invention may also be a sub-combination of these described features.

BRIEF DESCRIPTION OF THE DRAWINGS

FIGS. 4A, 4B, and 4C are examples and schematic top view of a scene on a calculation result of a recommended control input in the case of the first embodiment of the vehicle operator driving assistance improving system shown in FIG. 1.

FIGS. 5A, 5B, and 5C are other examples and schematic top view of another scene on the calculation result of the recommended control input in the case of the first embodiment of the vehicle operator driving assistance improving system shown in FIG. 1.

FIGS. 12A, 12B, and 12C are examples and schematic top view of the result of the calculation of the recommended control input in the third preferred embodiment according to the present invention.

FIGS. 15A, 15B, and 15C are views representing an example of the result of calculation of the recommended control input in the fourth preferred embodiment according to the present invention.

DETAILED DESCRIPTION OF THE PREFERRED EMBODIMENTS

Reference will hereinafter be made to the drawings in order to facilitate a better understanding of the present invention.

(First Embodiment)

Figure 1:
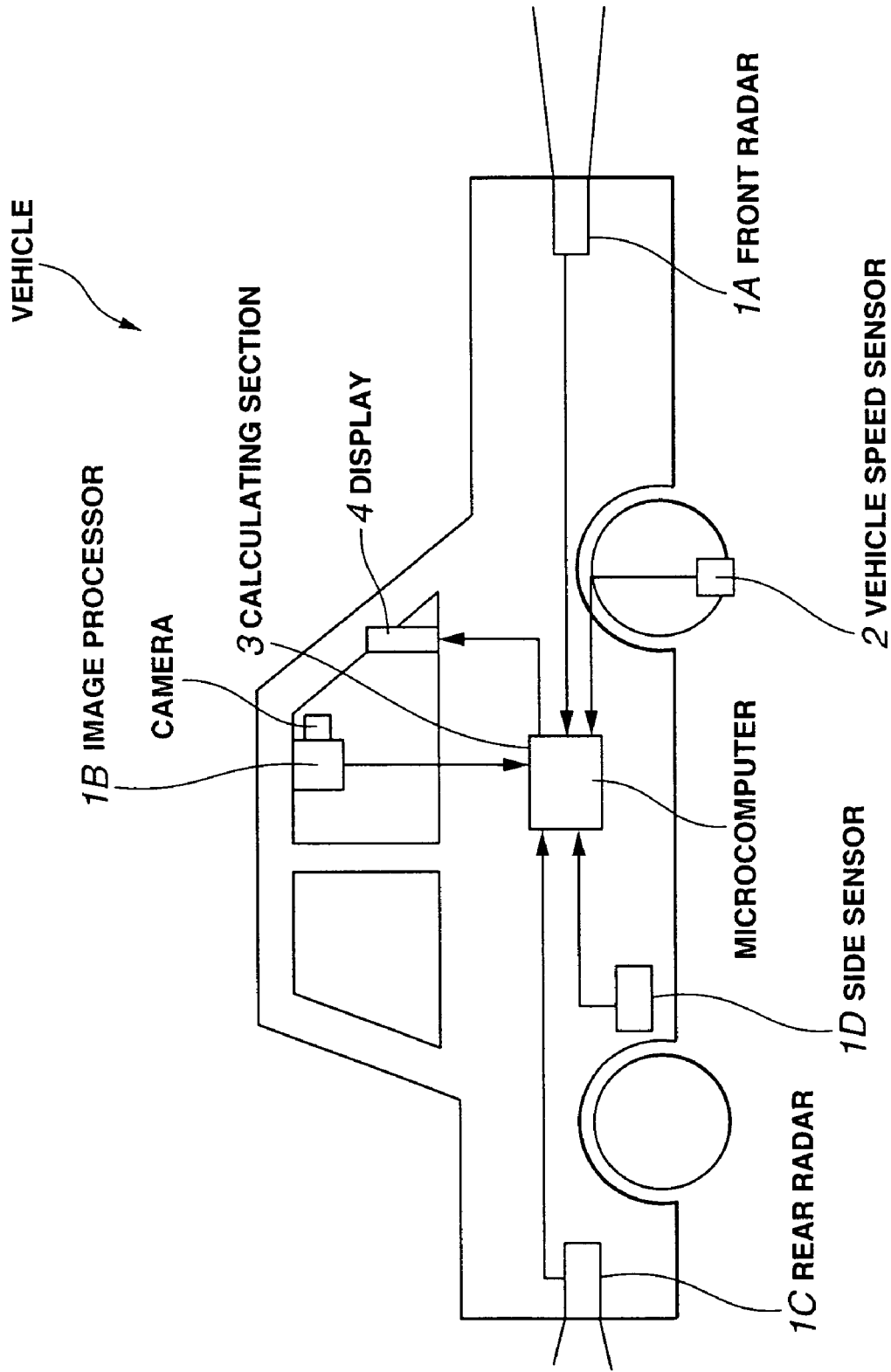
FIG. 1 is a system configuration view of a vehicle operator driving assistance improving system in a first preferred embodiment according to the present invention.

FIGS. 1 through 6 show a first preferred embodiment of a system for improving a vehicle operator driving assistance of an automotive vehicle in a first preferred embodiment according to the present invention. FIG. 1 shows a system configuration view of the vehicle operating driving assistance improving system in the first preferred embodiment needed to construct the system for improving the vehicle operator driving assistance according to the present invention.

In FIG. 1, a front radar 1A is mounted on a front surface of an automotive vehicle (or simply called a vehicle) to measure positions of a plurality of surrounding vehicles placed ahead of the vehicle. An image sensor (or image processor) 1B is mounted on an appropriate position of a vehicular front surface to compensate for a measurement information of front radar 1A and to detect traffic lanes drawn on a traveling road. Rear radar 1C is mounted on a rear surface of the vehicle to measure the positions of a plurality of surrounding vehicles placed behind the vehicle. A side sensor (left and right side sensors) 1D is mounted on each side surface of the vehicle to detect the positions of the surrounding vehicles located at vehicular side portions which provides dead angles for front and rear radars 1A and 1C. It is noted that each side sensor 1D may be constituted by the radar unit but may be constituted by an ultrasonic sensor or image sensor (such as a CCD (Charge Coupled Device) camera. A vehicle speed sensor 2 is achievable by attaching rotary encoders onto non-driven road wheels and outputs a pulse train having a period corresponding to a revolution speed of the non-driven wheels to obtain a measured value of a vehicle speed (or called, a vehicular velocity). A calculating section 3 is constituted by a microcomputer and its peripheral circuits, an output signal from each sensor described above is processed in accordance with a program recorded onto an built-in memory of calculating section 3, and results of calculations are supplied (transferred) to display unit 4 (display 4).

Display unit (display 4) is constituted by a display such as having a liquid crystal display screen, a microcomputer, and its peripheral circuits to draw displayed images on the display screen. Display 4 processes the signal supplied from calculating section 3 in accordance with a drawing program of image onto display 4 to inform the driver of an information (such as a command information) through the display screen as will be described later.

Figure 2:
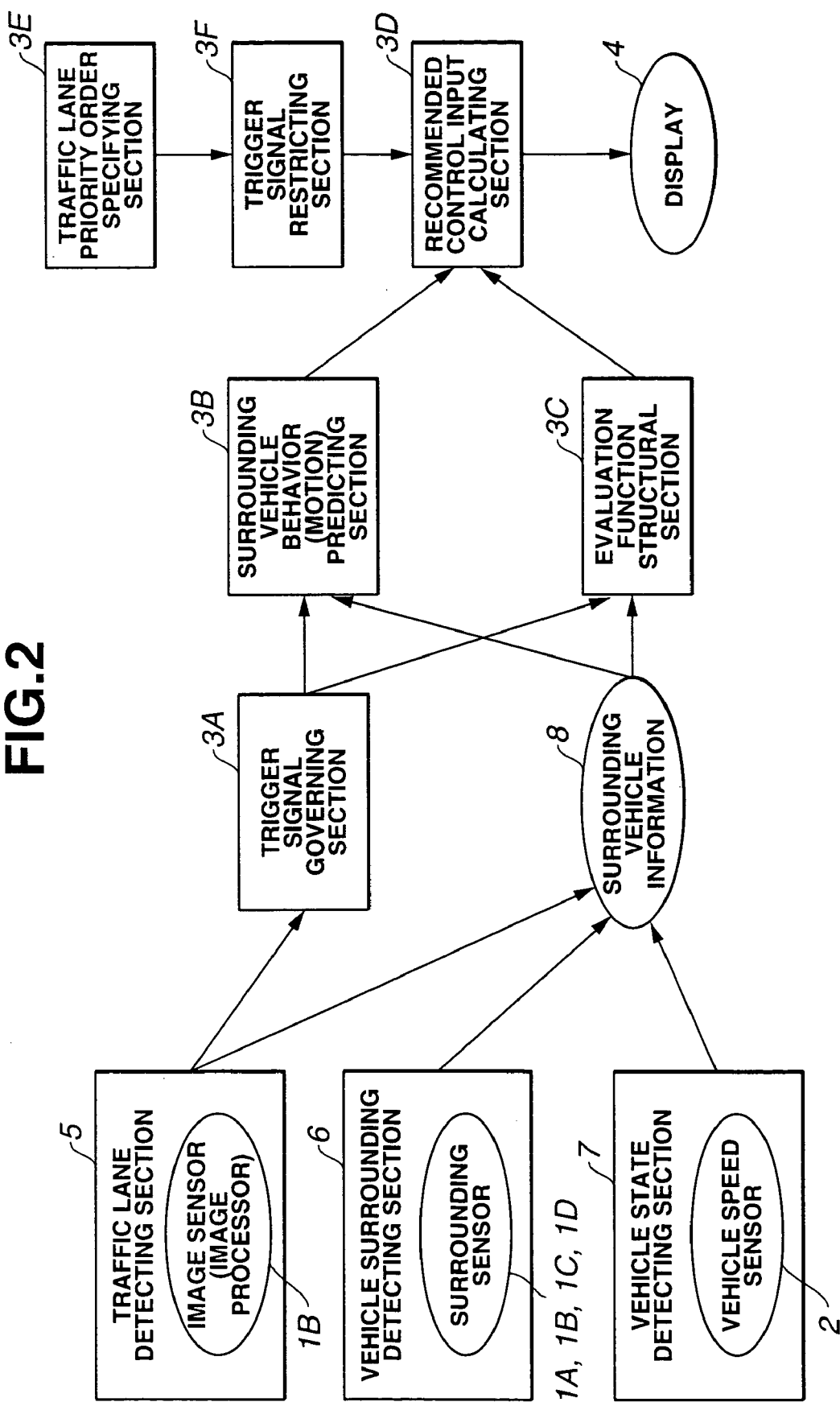
FIG. 2 is a functional block diagram of the vehicle operator driving assistance improving system in the first embodiment according to the present invention.

Calculating section 3 is constituted by a plurality of sections 3A through 3F shown in FIG. 2 in terms of a software of the microcomputer (usually stored in its ROM (Read Only Memory).

In FIG. 2, 3A denotes a trigger signal governing (managing) section, 3B denotes a surrounding vehicle behavior (motion) predicting section, 3C denotes an evaluation function structural section, 3D denotes a recommended control input calculating section, 3E denotes a priority traveling traffic lane specifying section, and 3F denotes a trigger signal restricting section. In FIG. 2, a traffic lane detecting section 5 is provided which is constituted by image sensor (image processor) 1B as a traffic lane detector, a vehicle surrounding detecting section 6 constituted by surrounding front and rear radars and side sensors 1A, 1B, 1C, and 1D, and a vehicle state detecting section 7 which is constituted by vehicle speed sensor 2. It is noted that a reference numeral 8 shown in FIG. 2 denotes a vehicular surrounding (collection) information.

Figure 3:
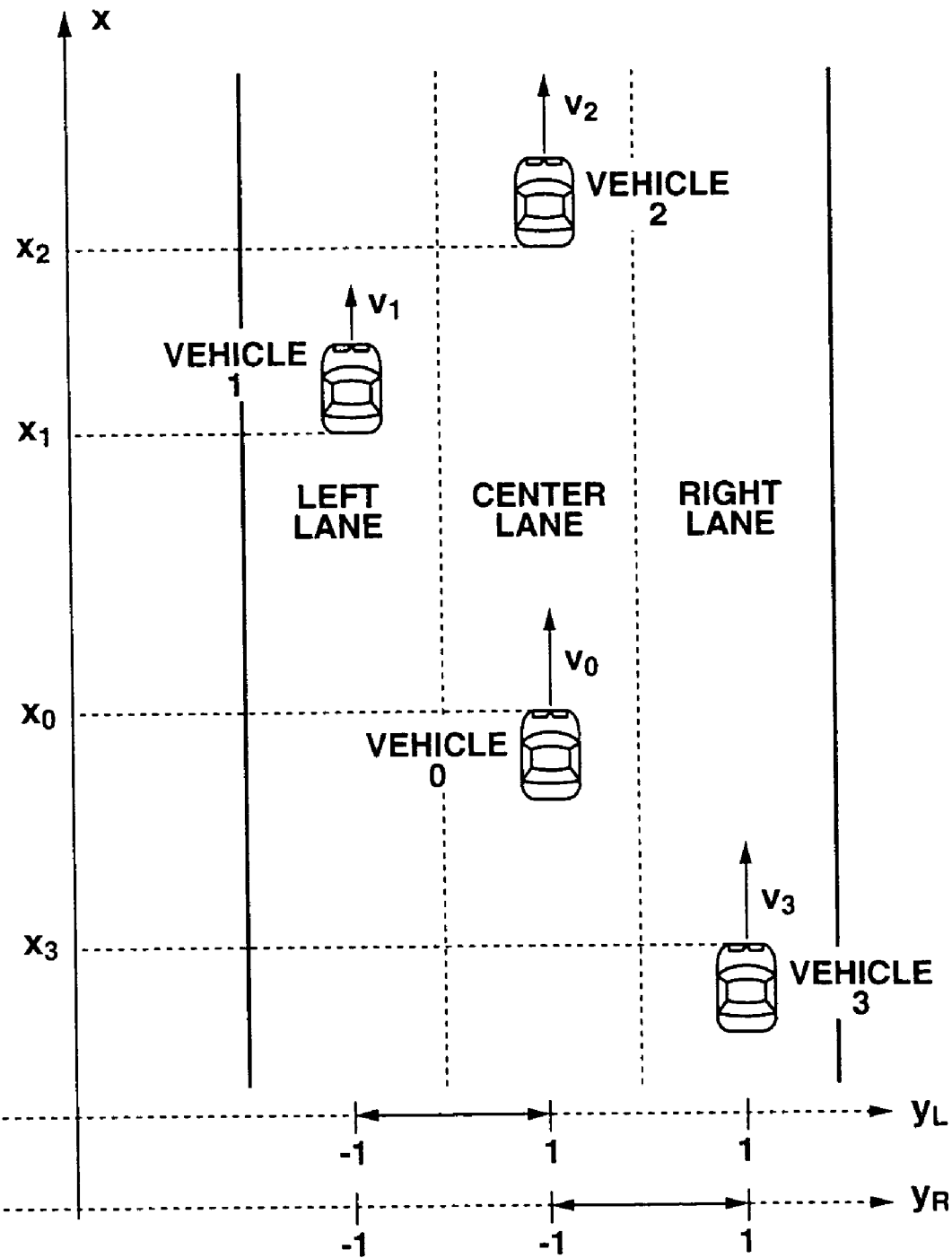
FIG. 3 is a schematic top view of a scene of application of the vehicle operator driving assistance improving system in the first embodiment shown in FIG. 1.

Specific structures of each section shown in FIG. 2, viz., sections 3A through 3F will be described below on the basis of an example of an operation of the first embodiment in such a road situation as shown in FIG. 3.

That is to say, FIG. 3 shows a road scene in which the host vehicle (a vehicle in which the vehicle operator driving assistance improving system is mounted and which is defined as vehicle 0) and three other vehicles (defined as vehicle 1, vehicle 2, and vehicle 3) are traveling on a straight road in a form of one-side three-traffic-lanes road. In FIG. 3, suppose that the host vehicle (vehicle 0) on a center lane is traveling at a speed faster than vehicle 2 traveling on the same center lane so that an inter-vehicle distance from vehicle 0 to vehicle 2 becomes shortened. In order to keep the present traveling speed, it is necessary for vehicle 0 to change the traffic lane toward a left lane or right lane. However, vehicle 1 located at a forward direction of a left lane (with respect to vehicle 0) is traveling at a speed slower than vehicle 0 and vehicle 3 located at a rearward direction of the right lane is traveling at a speed faster than vehicle 0. Hence, there is a considerable risk if an immediate traffic lane change is made by vehicle 0.

Herein, x coordinate is taken along a forwarding (longitudinal) direction of the road and a variable representing a value of x coordinate of each vehicle is expressed as $x_i$ (i=0, 1, 2, 3 and i is an index to identify each vehicle). The traveling speed in the longitudinal direction of each vehicle is represented by $v_i$. A relative position to vehicle 0 and a relative speed to each of the other vehicles can be obtained from vehicle surrounding sensors 1A through 1D shown in FIG. 1. Hence, if an origin of a coordinate system is appropriately set, specific values of x coordinate of vehicle 0 and each of the other vehicles (vehicle 1, vehicle 2, and vehicle 3) can be ascertained. In addition, if the speed (velocity) of vehicle 0 is measured with vehicle speed sensor 2, the value of speed (velocity) $v_i$ of each vehicle including vehicle 0 can specifically be ascertained together with the information on the relative speed (velocity) obtained from surrounding sensors 1A through 1D. In addition, by means of a traffic lane recognition using image sensor (image processor) 1B, positions of the lanes on which the respective vehicles (vehicle 0 through vehicle 3) are instantaneously (presently) traveling can be ascertained.

Two ways of driving operations (maneuvers) to vehicle 0 on the traffic lane change from the center lane toward the right lane and toward the left lane can be considered in the case of a multiple number traffic lane road equal to or more than three traffic lanes. Hence, if a recommended control input is generated, it is necessary to explicitly indicate which lane of either the left or right lane vehicle 0 is to be lane changed. On the other hand, in a case where vehicle 0 is traveling on a two-traffic-lanes road, a single traffic lane change trigger signal (hereinafter, also abbreviated as a trigger signal) is introduced, an amplitude (or frequency) of the trigger signal expresses the right lane change and left lane change to enable to represent the traffic lane change. In a case of the three-traffic-lanes road, two of a trigger signal $u_L$ expressing the traffic lane change between the left traffic lane and the center traffic lane and a trigger signal $u_R$ expressing the traffic lane change between the center lane and the right lane are introduced. Thus, a combination of trigger signals of $u_L$ and $u_R$ causes the traffic lane changed position to be indicated (commanded). As far as each trigger signal ($u_L$, $u_R$) is concerned, a value corresponding to the left side traffic lane is defined as −1 and a value of each trigger signal corresponding to the right traffic lane is defined as 1. At this time, a corresponding relationship between a trigger signal pattern and a traffic lane command position can be defined as follows:

$$(u_L, u_R) = \begin{cases} (-1, -1) \\ (1, -1) \\ (1, 1) \end{cases} \quad (1)$$

wherein (−1, −1) denotes a left traffic lane position command value, (1, −1) denotes a center traffic lane position command value, and (1, 1) denotes a right traffic lane position command value. Trigger signal governing (managing) section 3A generates the lane change trigger signals (whose number is one less than the number of the detected traffic lanes) in accordance with the detected traffic lane numbers as described above. This section 3A is a processing section that processes the traffic lane changes for all detected traffic lanes so as to be enabled to be expressed mathematically in a form of a combination of the patterns of the trigger signals.

Next, surrounding vehicle behavior (motion) predicting section 3B is constructed as follows: First, a longitudinal model predicting a motion of vehicle 0 along a traveling traffic lane constitutes surrounding vehicle behavior predicting section 3B. The longitudinal model can be considered according to the following model.

$$\dot{x}_0 = v_0$$

and $$\dot{v}_0 = u_x \quad (2).$$

It is noted that $u_x$ denotes a command signal to vehicle operator on a vehicular acceleration or deceleration for vehicle 0 (host vehicle).

As a model describing a motion involved in a traffic lane change of vehicle 0, traffic lane variables are introduced which take continuous values to follow, with a delay in time, the trigger signal on the traffic lane change. Each of the trigger signals has a correlation with models such as $$\dot{y}_L = -\omega y_L + \omega u_L \quad (3)$$

and $$\dot{y}_R = -\omega y_R + \omega u_R \quad (4).$$

It is noted that $y_L$ and $y_R$ are traffic lane variables corresponding to trigger signals $u_L$ and $u_R$, respectively, and ω denotes an appropriate positive constant determining speeds for the traffic lane variables to follow the trigger signals. As far as each of the other surrounding vehicles is concerned, the following model is introduced.

$$\dot{x}_i = v_i$$

and $$\dot{v}_i = k_1^i(x_p^i - x_i - h_i v_i) + k_2^i(v_p^i - v_i) + k_v^i(v_d^i - v_i) \quad (5).$$

In equations (5), $x_p$ and $v_p$ denote variables representing the position and speed corresponding to a preceding vehicle to vehicle i and $k_1^i$, $k_2^i$, $k_v^i$, and $h_i$ denote positive parameters to determine following characteristics to the preceding vehicle of vehicle i and $v_d^i$ denote a desired travel vehicle speed of vehicle i. It is noted that, if another vehicle corresponding to the preceding vehicle is not present for vehicle i, for convenient purpose, these equalities of $x_p = x_i + h_i v_i$, and $v_p = v_i$ are substituted into equations (5) as an imaginary preceding vehicle information so that equations (5) are coincident with models controlling desired vehicle speeds expressed as in equations (6) as target vehicle speed (velocity).

$$\dot{x}_i = v_i$$

and $$\dot{v}_i = k_v^i(v_d^i - v_i) \quad (6).$$

Specifically, for vehicle 1, vehicle 0 serves as the preceding vehicle to vehicle 1 when vehicle 0 makes the traffic lane change toward a forward direction of the left lane with respect to vehicle 1 in FIG. 3. If not so, since no preceding vehicle is present, equations of (7) and (8) can be applied to the situation described above.

$$x_p^1 = \begin{cases} x_o + (x_1 + h_1 v_1 - x_0)\dfrac{1 + \sin(\pi y_L/2)}{2} & x_0 > x_1 \\ x_1 + h_1 v_1 & x_0 < x_1 \end{cases} \quad (7)$$

$$v_p^1 = \begin{cases} v_0 + (v_1 - v_0)\dfrac{1 + \sin(\pi y_L/2)}{2} & x_0 > x_1 \\ v_1 & x_0 < x_1 \end{cases} \quad (8)$$

For vehicle 2, in a case where vehicle 2 is left behind by vehicle 0 from either the left or right lane, there is a possibility of vehicle 0 to be the preceding vehicle.

$$x_p^2 = \qquad (9)$$

$$\begin{cases} x_o + (x_1 + h_2 v_2 - x_0)\left(\dfrac{1 + \sin(\pi y_L/2)}{2}\right)\left(\dfrac{1 - \sin(\pi y_R/2)}{2}\right) & x_0 > x_2 \\ x_2 + h_2 v_2 & x_0 < x_2 \end{cases}$$

$$v_p^2 = \begin{cases} v_0 + (v_2 - v_0)\left\{\dfrac{1 + \sin(\pi y_L/2)}{2}\right\}\left\{\dfrac{1 - \sin(\pi y_R/2)}{2}\right\} & x_0 > x_2 \\ v_2 & x_0 < x_2 \end{cases} \quad (10)$$

For vehicle 3, since vehicle 0 becomes the preceding vehicle when vehicle 0 is tried to make the traffic lane change toward the front direction to vehicle 3 at the right lane, the following equations (11) and (12) are established.

$$x_p^3 = \begin{cases} x_0 + (x_1 + h_3 v_3 - x_0)\dfrac{1 + \sin(\pi y_R/2)}{2} & x_0 > x_3 \\ x_3 + h_3 v_3 & x_0 < x_3 \end{cases} \quad (11)$$

$$v_p^3 = \begin{cases} v_0 + (v_3 - v_0)\dfrac{1 + \sin(\pi y_R/2)}{2} & x_0 > x_3 \\ v_3 & x_0 < x_3 \end{cases} \quad (12)$$

It is noted that, in this embodiment, since the other vehicles (vehicle 1, vehicle 2, and vehicle 3) are supposed not to make the lane change, lateral motion models of the other vehicles are not set. As described above, the specific elements constituting surrounding vehicle behavior predicting section 3B shown in FIG. 2 have been explained.

A vector X into which the variables required to calculate the recommended control input by means of recommended control input calculating section 3D is defined as follows $$X = (x_0\ v_0\ y_L\ y_R\ x_1\ v_1\ x_2\ v_2\ x_3\ v_3) \quad (13).$$

In addition, for later explanation conveniences, surrounding vehicle (group) behavior predicting section 3B is collectively represented as follows:

$$\dot{X} = f(X, u_x, u_L, u_R) \quad (14).$$

In this embodiment, a specific form of function $f(X, u_x, u_L, u_R)$ can be expressed as follows:

$$f(X, u_x, u_L, u_R) = \begin{pmatrix} v_0 \\ u_x \\ -\omega y_L + \omega u_L \\ -\omega y_R + \omega u_R \\ v_1 \\ k_1^1(x_p^1 - x_1 - h_1 v_1) + k_2^1(v_p^1 - v_1) + k_V^1(v_d^1 - v_1) \\ v_2 \\ k_1^2(x_p^2 - x_2 - h_2 v_2) + k_2^2(v_p^2 - v_2) + k_V^2(v_d^2 - v_2) \\ v_3 \\ k_1^3(x_p^3 - x_3 - h_3 v_3) + k_2^3(v_p^3 - v_3) + k_V^3(v_d^3 - v_3) \end{pmatrix} \quad (15)$$

Next, evaluation function structural section 3C will be explained below. An evaluation function is defined as a function to evaluate a state of a vehicle group from the present state to a near future vehicle group state after a constant period of time has passed and a driving operation for vehicle 0. The variables representing the operation (maneuver) for vehicle 0 in the case of the travel on the three-traffic-lanes road are three of $u_x$, $u_L$, and $u_R$ and the evaluation function can be expressed in the following form:

$$J[u_x, u_L, u_R] = \int_t^{t+T} L(\tau) d\tau. \quad (16)$$

However, function L is an evaluation equation which has expressed an evaluation criterion to the operation of the driver (vehicle operator), t denotes a present time point, and T denotes a length of the predicted time. Herein, four terms of a longitudinal motion evaluation term, a surrounding vehicle evaluation term, a speed evaluation term are considered as a specific expression equation of function L. Longitudinal motion evaluation term Lx is constituted by an evaluation equation representing a demand that a magnitude of the acceleration/deceleration of vehicle 0 is reduced as small as possible. Specifically, the following evaluation equation (17) may be considered. That is to say, $$L_x(u_x) = \frac{1}{2} u_x^2. \quad (17)$$

Surrounding vehicle evaluation term Ls is constituted by adding a risk defined for each lane. The risk for each lane is defined according to a relative motion state between the preceding vehicle and following vehicle on the corresponding traffic lane. For example, a square of an inverse number of an inter-vehicle time to the preceding vehicle (which is expressed as an inter-vehicle distance divided by a speed of the host vehicle (inter-vehicle distance/speed)) can be utilized as an index number representing the risk. In the case of FIG. 3, as the risk of vehicle 0 to vehicle 1, the following equality can be used.

$$L_1(x_0, v_0, x_1, v_1) = \left(\frac{v_0}{x_1 - x_0}\right)^2. \quad (18)$$

In a case of the road situation shown in FIG. 3, only vehicle 1 is traveling on the left lane. Hence, a risk $L_L(X)$ on the left lane can be expressed as follows:

$$L_L(X) = L_1(x_0, v_0, x_1, v_1) \quad (19).$$

In the same way, risks $L_C(X)$ and $L_R(X)$ of the center lane and the right lane are represented using risks $L_2$ and $L_3$ of vehicle 0 to vehicle 2 and vehicle 3.

$$L_C(X) = L_2(x_0, v_0, x_2, v_2) \quad (20).$$

$$L_R(X) = L_3(x_0, v_0, x_3, v_3) \quad (21).$$

In equations of (20) and (21), $$L_2(x_0, v_0, x_2, v_2) = \left(\frac{v_0}{x_2 - x_0}\right)^2. \quad (22)$$

$$L_3(x_0, v_0, x_3, v_3) = \left(\frac{v_0}{x_3 - x_0}\right)^2. \quad (23)$$

A risk over a whole surrounding environment is defined by combining the risk of each lane using the traffic lane variables. Surrounding vehicle evaluation term $L_S$ is constituted by the following equation (24) using left connection function $c_L(y)$ and right connection function $c_R(y)$. It is noted that left connection function $c_L(y)$ and right connection function $c_R(y)$ are defined as follows: the connection function is a function in which the traffic lane variable is mapped on a closed interval with 0 and appropriate real number as both ends and includes the left connection function in which a value of the traffic lane variable which corresponds to the left side lane is mapped on 0 and the right connection function in which a value of traffic lane variable which corresponds to the right side lane is mapped onto 0.

That is to say, $$L_s(X) = c_L(y_L)L_L(X) + c_L(y_R)c_R(y_L)L_c(X) + c_R(y_R)L_R(X) \quad (24).$$

As a specific form of the connection function, such functions as described in equations (25) can be utilized.

$$c_L(y) = -\frac{1}{2}(y-1), \quad (25)$$

$$c_R(y) = \frac{1}{2}(y+1).$$

Thus, $c_L(y_L) = -\frac{1}{2}(y_L-1)$, $$c_R(y_R) = -\frac{1}{2}(y_R-1),$$

$$c_R(y_L) = \frac{1}{2}(y_L+1),$$

and $c_L(y_R) = \frac{1}{2}(y_R+1)$ \quad (25)'

Traffic lane evaluation term $L_Y$ utilizes an equation of the square of a deviation between each trigger signal and its corresponding traffic lane variable. In details, for each of a left lane variable and a right lane variable, such equations as described below are defined.

$$L_{YL}(u_L, y_L) = \frac{1}{2}(u_L - y_L)^2. \quad (26)$$

$$L_{YR}(u_R, y_R) = \frac{1}{2}(u_R - y_R)^2. \quad (27)$$

The following equation (28) is utilized as traffic lane evaluation term $L_Y$.

$$L_Y(u_L, u_R, y_L, y_R) = L_{YL}(u_L, y_L) + L_{YR}(u_R, y_R) \quad (28).$$

Evaluation terms of (26) and (27) have an effect of suppressing a generation of a pattern of vibration-like (vibrant) trigger signals.

Speed evaluation term $L_v$ is constituted by an evaluation equation representing a demand that the speed of vehicle 0 is maintained in a vicinity to a desired traveling vehicle speed as near as possible. For example, desired traveling vehicle speeds at left traffic lane, center lane, and right lane are, respectively, denoted by $v_d^L$, $v_d^C$, and $v_d^R$. Then, the speed evaluation equation for each traffic lane is defined in the following equations of (29), (30), and (31).

$$L_{VL}(v_0) = \frac{1}{2}(v_0 - v_d^L)^2. \quad (29)$$

$$L_{VC}(v_0) = \frac{1}{2}(v_0 - v_d^C)^2. \quad (30)$$

$$L_{VR}(v_0) = \frac{1}{2}(v_0 - v_d^R)^2. \quad (31)$$

The speed evaluation equation term over the whole traffic lanes constitutes the following equation of (32).

$$L_v(v_0, y_L, y_R) = c_L(y_L)L_{VL}(v_0) + c_L(y_R)c_R(y_L)L_{vc}(v_0) + c_R(y_R)L_{VR}(v_0) \quad (32).$$

A whole evaluation equation L is set with the above-described evaluation terms collected.

$$L(\tau) = w_x L_x + w_y L_y + w_s L_s + w_v L_v, \quad (33)$$

In equation (33), $x_x$, $w_y$, $w_s$, and $w_v$ denote weighting parameters for each evaluation term. As described hereinabove, functions in surrounding vehicle behavior (motion) predicting section 3B and in evaluation function structural section 3C are constructed so as to satisfy differentiability. In the calculation of the recommended control input, such an optimum control theorem that searches an optimal solution efficiently on the basis of a differential of a function can be utilized.

In the theorem of the optimum control, an auxiliary variable vector e "··" having dimensions which are the same as those of a model is introduced and is used in an optimization calculation. It is noted that "··" denotes a vector in the whole specification. In numerical equations with brackets ( ), "··" is located above a variable and superscript ·· has the same meaning to "··" located above the variable. However, in order to avoid a confusion against a mark representing a linear ordinary differential equation of second order, another marking, for example, of $\vec{e}$ or a capital letter of λ, namely, Λ (lambda) may be used instead of "··". In this embodiment, since an order of each model is 10 dimensions, the following auxiliary variable vector is given.

$$\vec{e} = (\lambda_1 \, \lambda_2 \, \lambda_3 \, \ldots \, \lambda_{10})^T \quad (34).$$

The following function (called, Hamiltonian) is defined from the auxiliary variable vectors, the prediction equation, and the evaluation function.

$$H(X, \vec{e}, u_x, u_L, u_R) = L(\tau) + \vec{e}^T f(X, u_x, u_y, u_R) \quad (35).$$

A necessary condition for time series of command values $u_x(\tau)$, $u_L(\tau)$, $u_R(\tau)$ wherein $0 \leq \tau \leq T$ to give an optimal solution to minimize evaluation function $L(\tau)$ can be described as follows:

$$\frac{dX^*}{d\tau} = f(X^*, u_x^*, u_L^*, u_R^*), \quad X^*(\tau=0) = X(\tau=0). \quad (36)$$

$$\frac{d\vec{e}^*}{d\tau} = \frac{\partial H(X^*, \vec{e}^*, u_x^*, u_L^*, u_R^*)}{\partial X}, \quad \vec{e}^*(\tau=T) = 0. \quad (37)$$

$$\begin{pmatrix} u_x^*(\tau) \\ u_L^*(\tau) \\ u_R^*(\tau) \end{pmatrix} = \arg\min_{u_x, u_L, u_R} H(X^*(\tau), \vec{e}^*(\tau), u_x(\tau), u_L(\tau), u_R(\tau)). \quad (38)$$

In equations (36), (37), and (38), * denotes a subscript representing a quantity corresponding to the optimal solution and equations (36) and (37) provide two-point boundary-value problems of ordinary differential equations. It is necessary to contrive to some degree to solve the problem. Especially required contrivances are calculations of trigger signals $u_L^*$ and $u_R^*$. As will be described below, a particular restriction is imposed on the calculation of the recommended control input. Hence, there are some parts which do not conform to a general solution. On the other hand, if $u_L$ and $u_R$ are fixed, the problem of deriving $u_x^*$ becomes a general solution. For example, two literatures are published, as far as the specific calculation method is concerned: Literature 1: a Japanese Book titled "Engineering Optimum Control—approach to nonlinearity—" authored by Tokyo University Publishing Society on Feb. 10, 1991 (particularly, pages 79 and 80); and literature 2: T. OHTSUKA "Continuation/GMRES method for fast algorithm of nonlinear receding horizon control" Proc. 39-th IEEE Conference on Decision and Control, pp. 766 to 771, 2000. These literatures indicate specific calculation methods. The calculation of recommended control input can be executed using such a specific calculation method as described above.

Therefore, supposing that appropriate temporal solutions are set on $u_L$ and $u_R$ and $u_x^*$, $X^*$, and $\ddot{e}^*$ could be calculated using the temporal solutions, a process in which the temporary (or temporal) solutions are updated from equation (38) will be described below. This can consider such a calculation method that checks on optimality condition equations (36), (37), and (38) are made for the updated temporary (temporal) solutions, if one of the updated temporary (temporal) solutions satisfy the optimality condition, this one is outputted as the recommended control input, and, on the contrary, if the updated temporary (temporal) solution does not satisfy the optimality condition, this updated temporary (temporal) solution is utilized for the next updating as a new temporary (temporal) solution. It is noted that the temporary (temporal) solution can set as, for example, a solution such that the present traveling traffic lane is directly maintained without lane change as an initial solution. In a case where the Hamiltonian is constituted by the prediction equation expressed in equation (15) and the evaluation function of equation (33), from among terms constituting the Hamiltonian, if only the terms related to $u_L(\tau)$ and $u_R(\tau)$ are picked up, the following part of Hamiltonian is given.

$$H = \cdots + (\omega\lambda_3 - w_Y y_L)\mu_L + (\omega\lambda_4 - w_Y y_R)\mu_R + \frac{w_Y}{2}u_L^2 + \frac{w_Y}{2}u_R^2 \cdots. \quad (39)$$

Hence, optimal solutions $u_L^*$ and $u_R^*$ are calculated in the following way from equation (38) described above.

$$(u_L^*, u_R^*) = \quad (40)$$

$$\begin{cases} (1, -1) & \begin{cases} \omega\lambda_3^* - w_Y y_L^* < 0 \\ \omega\lambda_4^* - w_Y y_R^* > 0 \end{cases} \\ (-1, -1) & \begin{cases} \omega\lambda_3^* - w_Y y_L^* > 0 \\ \omega\lambda_4^* - w_Y y_R^* > 0 \end{cases} \text{ or } \begin{cases} \omega\lambda_3^* - \omega_Y y_L^* > 0 \\ \omega\lambda_4^* - w_Y y_R^* < 0 \\ \omega(\lambda_3^* + \lambda_4^*) - w_Y(y_L^* + y_R^*) > 0 \end{cases} \\ (1, 1) & \begin{cases} \omega\lambda_3^* - w_Y y_L^* < 0 \\ \omega\lambda_4^* - w_Y y_R^* < 0 \end{cases} \text{ or } \begin{cases} \omega\lambda_3^* - w_Y y_L^* > 0 \\ \omega\lambda_4^* - w_Y y_R^* < 0 \\ \omega(\lambda_3^* + \lambda_4^*) - w_Y(y_L^* + y_R^*) < 0 \end{cases} \end{cases}.$$

As described above, the trigger signals for the traffic lane changes can be generated. However, at this time, two problems as will be described below are raised. One of the problems is that, in an actual traffic lane change, such a restriction to the effect that the vehicle can only be moved for each one traffic lane is not expressed in equation (40). Only equation (40) would be allowed to, for example, use such an invalid command value such as $(u_L^*,u_R^*)=(1, 1)$ which commands the driver to immediately travel on the right lane with the center lane skipped, from the command value of $(u_L^*,u_R^*)=(-1, -1)$ which commands the driver to travel on the left lane. To avoid this, with the present traffic lane position of vehicle 0 taken into consideration, it is necessary to impose the restriction such as to make the lane change for one lane. Specifically, when the recommended control input is calculated, trigger signal restricting section 3F checks the value of traffic lane variable of vehicle 0. Depending upon the state of the traffic lane variable, a restriction is imposed on a value to which the trigger signal can be obtained. For example, the following restrictive condition can be imposed.

That is to say, a calculation procedure is as follows: The determination of the traffic lane position according to the traffic lane variable is carried out. On the basis of the result of determination, a couple of the enabled trigger signal is determined. From among the group of the enabled trigger signals, the trigger signal which satisfies equation (38) is searched.

Furthermore, in order to make perfection more perfect, while, along with the variation in the trigger signal, each traffic lane variable is under a state of transition, such a restriction that a change or the modification in the present trigger signal is inhibited can be added. Each traffic lane variable follows the corresponding trigger signal with a delay in accordance with the dynamics such as equations (3) and (4). If this delay traces an actual physical motion, a transition state under which the traffic lane variables takes values except $-1$ and $1$, it can be deemed to be the transition state under which the motion along with the traffic lane change is being advanced.

If such a restriction that the traffic lane change is executed for one lane is considered, the restriction can be replaced with such another restriction that, in a case where a certain traffic lane variable is under the transition state, any other traffic lane variables should not be under the transition states. Therefore, only when such a condition that $$|u_L^* - y_L^*| \leq \epsilon \text{ or } |u_R^* - y_R^*| \leq \epsilon \quad (41)$$

is satisfied, the modification (or variation) in the trigger signal is enabled. If not so, such a calculation rule that a pattern of the trigger signal prior to one control step should be held represents such a restriction as described above. It is noted that, in equalities and inequalities (condition) of (41), $\epsilon$ denotes a positive small constant value introduced with a numerical calculation error taken into consideration.

The other of the above-described two problems is how to cope with a case where $\omega\lambda_3^* - w_Y y_L^* = 0$ or $\omega\lambda_4^* - w_Y y_R^* = 0$ is established. In this case, in the sense of the mathematics, it means that to which one of the (right and left) lanes the vehicle may be changed. However, it is necessary, in the calculation of the recommended control input, even if the evaluation of the lane is the same, to instruct a route by selecting either one of the lanes. Then, a priority traffic lane specifying section 3E shown in FIG. 2 specifies a priority of each lane to determine an output of this system in a case where the evaluation result is the same. For example, in the one-side three-traffic-lanes road as shown in FIG. 3, the right lane is a highest priority order, the center lane is a second highest priority order, and the left lane is a third highest priority order (a lowest priority order). In this way, the priority order is allocated to each lane. At this time, as shown in TABLE 1 which describes the restriction condition for the trigger signals, the enabled trigger signals are narrowed (throttled) and, at last, $\omega\lambda_3^* - w_Y y_L^* = 0$ or $\omega\lambda_4^* - w_Y y_R^* = 0$ so that the value of Hamiltonian corresponding to the enabled trigger signal becomes equal. In this case, one of the trigger signals which corresponds to the higher priority traffic lane is outputted as the recommended control input. For example, suppose a case where, under the vehicular traveling state on the center lane $\{(y_L^*, y_R^*) = (1, -1)\}$, the state of the traffic lane variable is varies as $\omega\lambda_3^* - w_Y y_L^* = 0$ or $\omega\lambda_4^* - w_Y y_R^* = 0$. In this case, $(u_L^*, u_R^*) = (1, 1)$ which commands the driver to change the traveling traffic lane to the right lane which is the highest priority order from among traffic lane changeable lanes is outputted as the recommended control input. As described above, the processing contents of recommended control input calculating section 3D executes the calculation of recommended control input by means of a repetitive calculation of the updating of temporal solution and check on the optimality condition described above. It is noted that the recommended control input is transferred to display 4 and produced to the driver via the display screen.

FIGS. 4A, 4B, 4C, 5A, 5B, and 5C shows two examples of the generation of the recommended control inputs in the scene of FIG. 3. First, FIGS. 4A, 4B, and 4C show results of a case where an initial inter-vehicle distance to vehicle 1 located on the left lane is $x_1-x_0=60$ m (meters). In the case of FIGS. 4A through 4C, the recommended control input such that vehicle 0 remains at the center lane and vehicle 3 at the left lane is traveling faster than vehicle 0 so that vehicle 0 is decelerated and vehicle 3 overpasses vehicle 0 and, thereafter, trigger signal $u_R$ is varied from −1 to 1 and the recommended control input such that vehicle 0 changes the lane to the right lane is obtained (refer to FIG. 4C). On the other hand, FIGS. 5A, 5B, and 5C show the results of a case where the initial inter-vehicle distance to vehicle 1 is $x_1-x_0=20$ (meters). In this case, such a recommended output that, after vehicle 0 overtakes vehicle 1, trigger signal $u_L$ is varied from 1 to −1 and the lane change to the left lane is commanded is obtained. As described above, such a consequence that the command to change the lane to either the left or right lane can be generated is obtained.

In summary, a whole processing flow will be explained with reference to a flowchart shown in FIG. 6. That is to say, at a step S1, calculating section 3 reads respective output signals from surrounding sensors of 1A, 1B, 1C, and 1D of vehicle surrounding detecting section 6 (and image processor 1B (or traffic lane detector)) and from vehicle speed sensor 2 of vehicle state detecting section 7. At the present time point, vehicle speed of each vehicle and a relative position between vehicle 0 and each of the surrounding vehicles are calculated. Thus, such a vector as shown in equation (13) is generated.

At a step S2, calculating section 3 generates the traffic lane change model such as equations (3) and (4) which are associated with the trigger signals and corresponding traffic lane variables only by the required number.

At a step S3, calculating section 3 sets the initial temporal solutions of trigger signals of $u_L$ and $u_R$ such that, for example, the present traffic lane position should be maintained as it is. At a step S4, calculating section 3 reads the setting contents of priority traffic lane specifying section 3E to assign the priority order for the detected lanes. At a step S5, calculating section 3 generates the longitudinal models of vehicle 0 and other vehicles (vehicle 1 and so on). Specifically, equation (2) as the longitudinal model of vehicle 0 and a model of equation (5) is generated for each detected vehicle and each model is initialized.

At a step S6, calculating section 3 is provided with (architects) evaluation equation $L(\tau)$ as shown in equation (33) and which is read in memory.

At a step S7, calculating section 3 uses the temporal solutions of set trigger signals $u_L$ and $u_R$ to solve the optimization problem through an appropriate technique. Longitudinal optimal solution $u_x^*$ and its corresponding two-point boundary-value problem $X^*$, and $\ddot{e}^*$ are calculated in calculating section 3. At a step S8, calculating section 3 updates the temporal solutions of trigger signals $u_L$ and $u_R$ on the basis of equation (40) and TABLE 1 and on the basis of solution $X^*$ of the two-point boundary-value problem derived at step S7 to achieve new temporal solutions of $u_L^*$ and $u_R^*$. At a step S9, calculating section 3 checks to see if $u_x^*$ derived at step S7 and new temporal solutions $u_L^*$ and $u_R^*$ derived at step S8 satisfy the optimality conditions of (36) through (38). If satisfied (Yes) at step S9, the routine shown in FIG. 6 goes to a step S10. At step S10, calculating section 3 outputs the values of $u_x^*$, $u_L^*$, and $u_R^*$ at the present time point as the recommended control inputs which are transferred to display 4. Then, the present routine of FIG. 6 is ended. If not satisfied at step S9 (No), the routine returns to step S7 with the present $u_x^*$, $u_L^*$, and $u_R^*$ as the temporal solutions to calculate new temporal solutions.

As described above, in this embodiment, the driving assistance improving system includes: vehicle surrounding detecting section 6 detecting the surrounding vehicles to vehicle 0; (host) vehicle state detecting section 7 detecting the vehicle state of vehicle 0; surrounding vehicle behavior (motion) predicting section 3B predicting the behaviors (motions) of the surrounding vehicles; the evaluation function structural section 3C calculating a desirableness of driving operation (maneuver) for vehicle 0 (host vehicle); and recommended control input calculating section 3D calculating the recommended control input constituted by the time series signal representing the magnitude of acceleration or deceleration for which vehicle 0 is to be desirable and the time series signal of the traffic lane change trigger signals, each trigger signal indicating one of the traffic lanes for vehicle 0 to be desirable and a timing at which the lane change is optimally made from the outputs of surrounding vehicle behavior predicting section 3B and evaluation function structural section 3C. The recommended control input calculating section 3D determines a necessity of the lane change for each adjacent lane in a case where vehicle 0 is traveling on the multiple lane road constituted by traffic lanes equal to three or more lanes and, in a case where the traffic lane change trigger signal commanding the driver to make the lane change is calculated, inhibits the calculation of the other of the traffic lane change trigger signals commanding the driver to change the traveling lane to another lane until the operation of the presently commended traffic lane change in accordance with the present trigger signal is completed. In this embodiment, since the necessity of the lane change for each adjacent lane is determined and the next lane change is not commanded until the lane change to the adjacent lane is completed in a case where the lane change is commanded, such an abrupt operation that vehicle 0 crosses two traffic lanes at once is suppressed. Consequently, the actual recommended control input can be generated with a smaller risk.

The vehicle operator driving assistance improving system, in this embodiment, cannot only suppress simply a risky driving operation (maneuver) but also can positively promote the driving with a small risk to the driver by transmitting the calculated information to the driver. It is insufficient for the future prediction merely to trace a value of the risk potential. A systematic procedure to insert the prediction is needed. In this system, the optimal driving operation which is produced to the vehicle operator can be more practical. In addition, in a case where the traveling road is the multiple number traffic lane road equal to or more than one-side three-traffic-lanes road, the lane change is merely recommended but also can produce to which the traffic lane the vehicle is recommended to be changed to the driver. In order to produce a timing at which the traveling lane should be changed to the driver in vehicle 0, a signal to trigger the lane change is defined. An algorithm of the recommended control input such as to output the trigger signal is designed. The trigger signal makes correspondent to the actual traffic lane so as to have a compatibility with a trigger signal algorithm to express the traffic lane and the timing at which the lane change is made can be produced to the driver in vehicle 0.

Next, the operator driving assistance improving system in the first embodiment further includes: the trigger signal governing (managing) section 3A to generate and delete the traffic lane change trigger signals; and the trigger signal restricting section 3F limiting a value that the lane change trigger signal can take in the recommended control input calculation according to the prediction state of the traffic lane for vehicle 0 calculated by surrounding vehicle behavior predicting section 3B.

Since, in the way described above, a single traffic lane change trigger signal is allocated to each group of mutually adjacent lanes. The determination of the necessity of the lane change can simply be executed by comparing an evaluation of a case where the corresponding trigger signal takes a value corresponding to the present traffic lane with the evaluation of the case where the trigger signal takes a value corresponding to the lane toward which vehicle 0 makes the lane change. In this addition, the lane change toward the left lane and that toward the right lane can be evaluated and compared independently of each other. Hence, a combination of determination logics or the lane change in the two-lane road permits systematic and simple calculations of the appropriate lane change trigger signals even if the number of lanes are increased. In addition, the system includes traveling lane priority order specifying section 3E specifying a travel priority order to each detected lane. Trigger signal restricting section 3F, during the recommended control input calculation, imposes the restriction on recommended control input calculating section 3D to output the traffic lane change trigger signal promoting the lane change to one of the lanes having a specified high priority by traveling traffic lane priority order specifying section 3E in a case where a desirableness to make the lane change toward the left lane and the desirableness to make the lane change toward the right lane are equal to each other and the evaluation such that it is desirable to make the lane change rather than not to make the lane change is obtained.

Since, as described above, the priority order is previously allocated (assigned) to each traffic lane. Hence, even if the desirableness to make the lane change toward the left lane is made equal to the desirableness to make the lane change toward the right lane, such an inconsistent calculation result that the trigger to make the lane change toward the left lane and the trigger to make the lane change toward the right lane are simultaneously raised can be prevented from occurring. Hence, the recommended control input without inconsistency can always be outputted.

In addition, trigger signal restricting section 3F imposes the restriction on recommended control input calculating section 3D such as to change the traffic lane change signal in a case where a group in which a deviation between the number of the traffic lanes corresponding to the value of the traffic lane change trigger signal is larger than a predetermined value is at least one present.

As described above, in this embodiment, the determination of whether the lane change to the most adjacent traffic lane is ended is carried out on the basis of the deviation between the number of the traffic lanes and the trigger signal. Thus, it becomes possible to make the following (tracing) delay of the traffic lane variable to the trigger signal correspondent to a time required to physically execute the lane change. Hence, a function to suppress the start of the subsequent lane change within a time until which the once lane change is not ended can systematically be achieved.

The evaluation function architected in evaluation function structural section 3C includes: the surrounding vehicle evaluation term that evaluates at least one of the relative position between vehicle 0 and the surrounding vehicle and the relationship of the vehicle speeds between vehicle 0 and the surrounding vehicle; and the longitudinal motion evaluation term that evaluates the longitudinal motion of vehicle 0. The surrounding vehicle evaluation term includes: the traffic lane evaluation term that evaluates a relative positional relationship between each surrounding vehicle located on each traffic lane; the left connection function that is a function to map the traffic lane variable on a closed interval with 0 and a certain appropriate real number value as both ends and that maps a value corresponding to the right traffic lane of the traffic lane variable on 0; and the right connection function that is a function to map a value corresponding to the left lane of the traffic lane variable on 0. A product between the left connection function with the traffic lane variable in which the traffic lane corresponding to each traffic lane evaluation term is made correspondent with the left lane as an input variable and the right connection function in which the traffic lane corresponding to each traffic lane evaluation term is made correspondent with the right lane as an input variable is taken so that the traffic lane term is constituted by an addition of terms of the product obtained for each traffic lane.

As described above, the driving assistance improving system, in the first embodiment, by linking functions representing the risk for the respective lanes by means of the continuous function using the traffic variables, the surrounding vehicle evaluation term to evaluate the risk caused by the surrounding vehicles is structured. Hence, such a continuous function as to evaluate the risk over the whole traffic lanes can be structured (architected) by defining the risk for each lane.

In addition, the left and right connection functions are differentiable monotonous increase or monotonous decrease function. Then, each of the left and right connection functions is such a connection function in which a differential coefficient at both ends of a domain of definition is not zero.

As described above, the connection function is constituted using the function which is differentiable and the differential coefficient is not zeroed. Hence, in the recommended control input calculation, a partial differential coefficient on the traffic lane variable of the evaluation function correctly reflects the variation in a value of the surrounding vehicle evaluation term along with the lane change. Thus, the recommended control input can be calculated efficiently utilizing the differentiation of the evaluation function.

In addition, the longitudinal motion evaluation term includes a term that evaluates the longitudinal motion of vehicle 0 which is on each lane; the addition of the product for each lane between the left connection function with the traffic lane variable in which the corresponding traffic lane made correspondent with the left lane as the input variable and the right connection function with the traffic variable in which the corresponding traffic lane made correspondent with the right lane as the input variable. Hence, since the connection functions permit the linkage of the longitudinal motion evaluation terms for the respective lanes, a desirable pattern of the acceleration and deceleration can be varied according to the traffic lane on which vehicle 0 is traveling.

Furthermore, the evaluation function architected in evaluation function structural section 3C includes the host vehicle speed evaluation term that evaluates the speed of vehicle 0. The host vehicle speed evaluation term includes: a term to evaluate the speed of vehicle 0 in a case where vehicle 0 is on each traffic lane; and the addition of the product for each lane between the left connection function with the traffic lane variable in which the corresponding traffic lane is made correspondent with the left lane as the input variable and the right connection function with the traffic lane variable in which the corresponding traffic lane is made correspondent with the right lane as the input variable.

As described above, since, in this embodiment, the connection functions permit the linkage of the host vehicle speed evaluation term for the respective traffic lanes, the traveling speed can be switched to a desirable traveling speed according to the traffic lane on which vehicle 0 is to travel.

(Second Embodiment)

Figure 6:
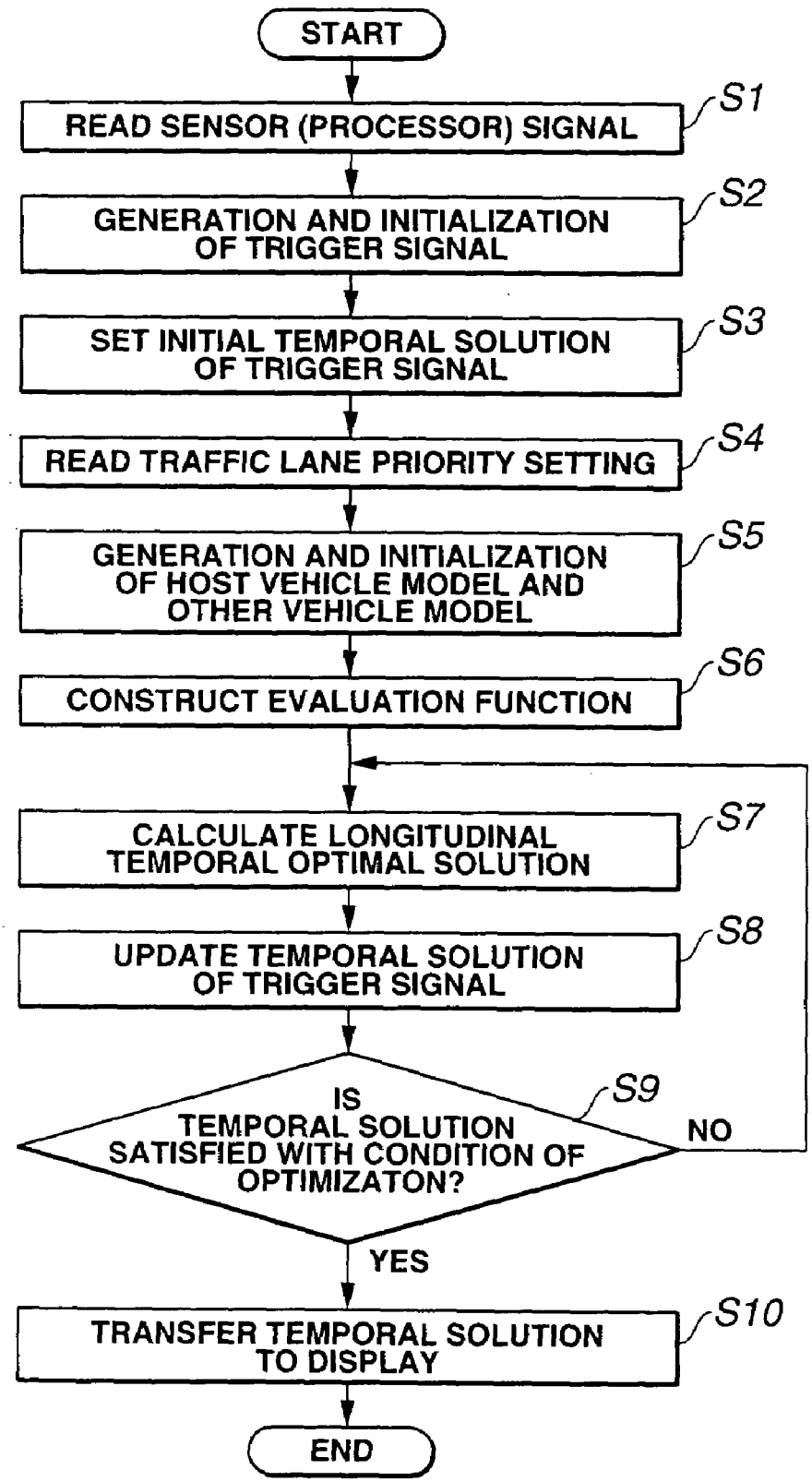
FIG. 6 is an operational flowchart representing a processing procedure executed in the first embodiment of the vehicle operator driving assistance improving system shown in FIG. 1.
Figure 7:
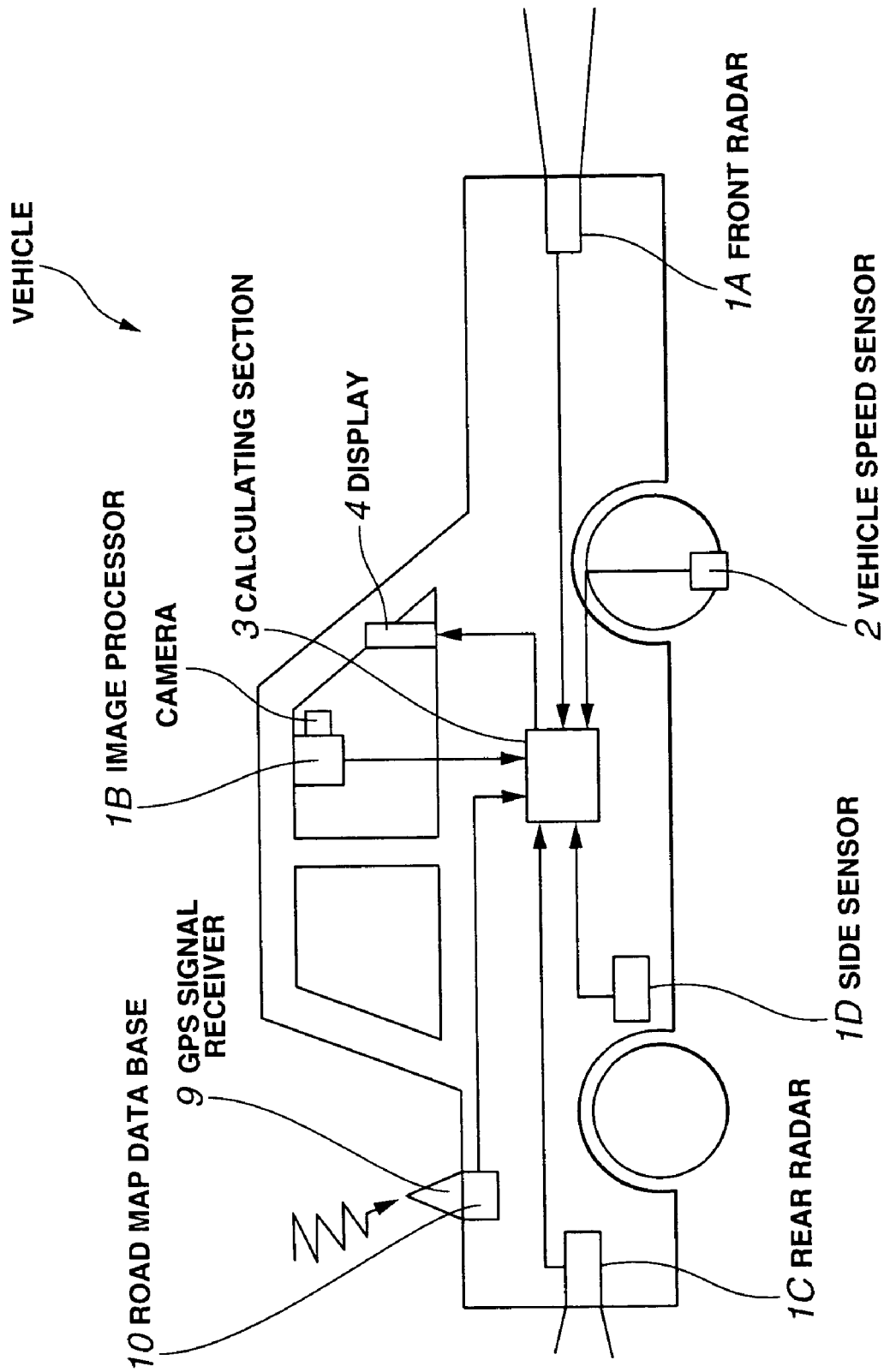
FIG. 7 is a system configuration view of the vehicle operator driving assistance improving system in a second preferred embodiment according to the present invention.
Figure 8:
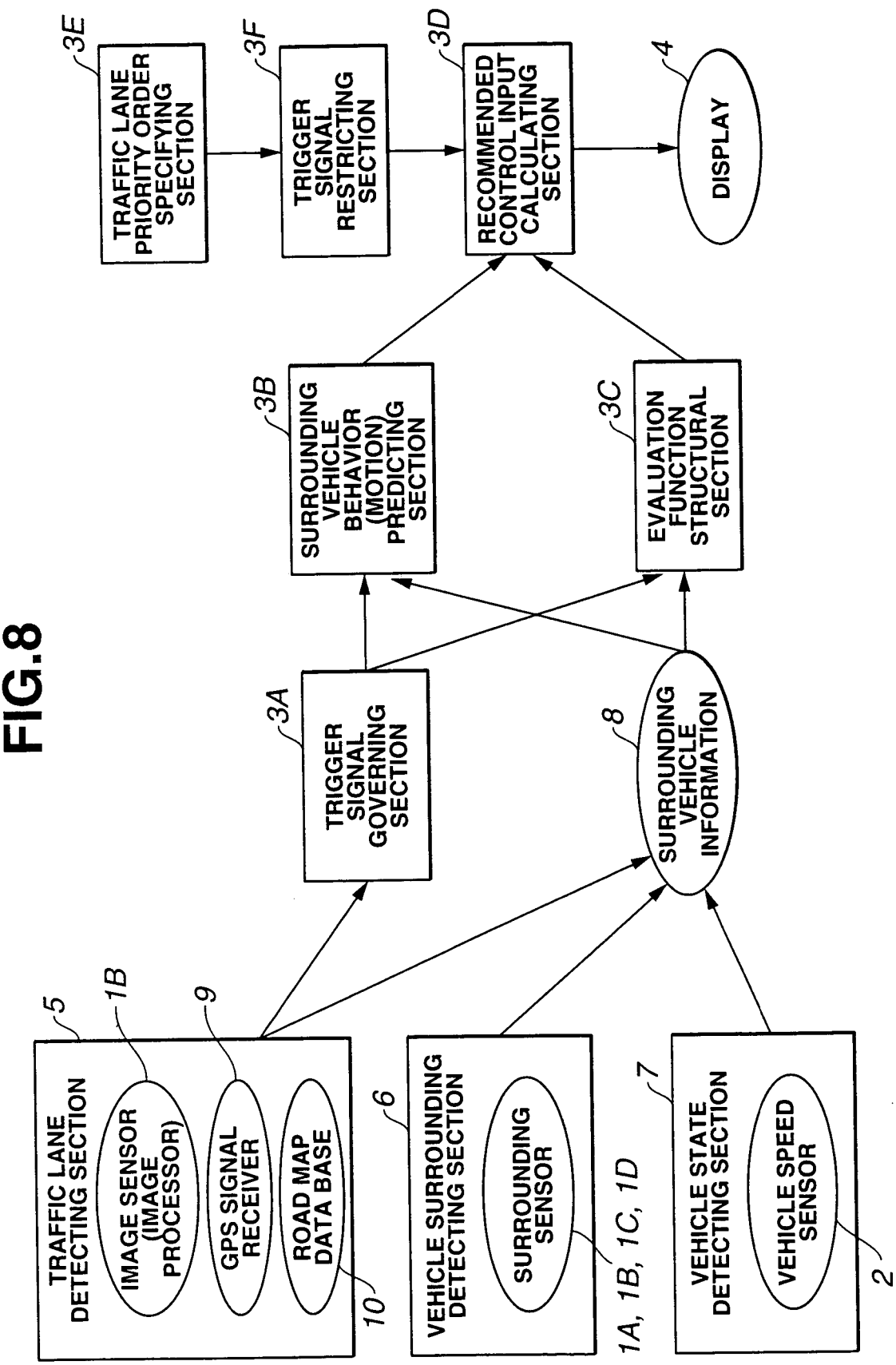
FIG. 8 is a function block diagram of the vehicle operator driving assistance improving system in the second embodiment shown in FIG. 7.
Figure 9:
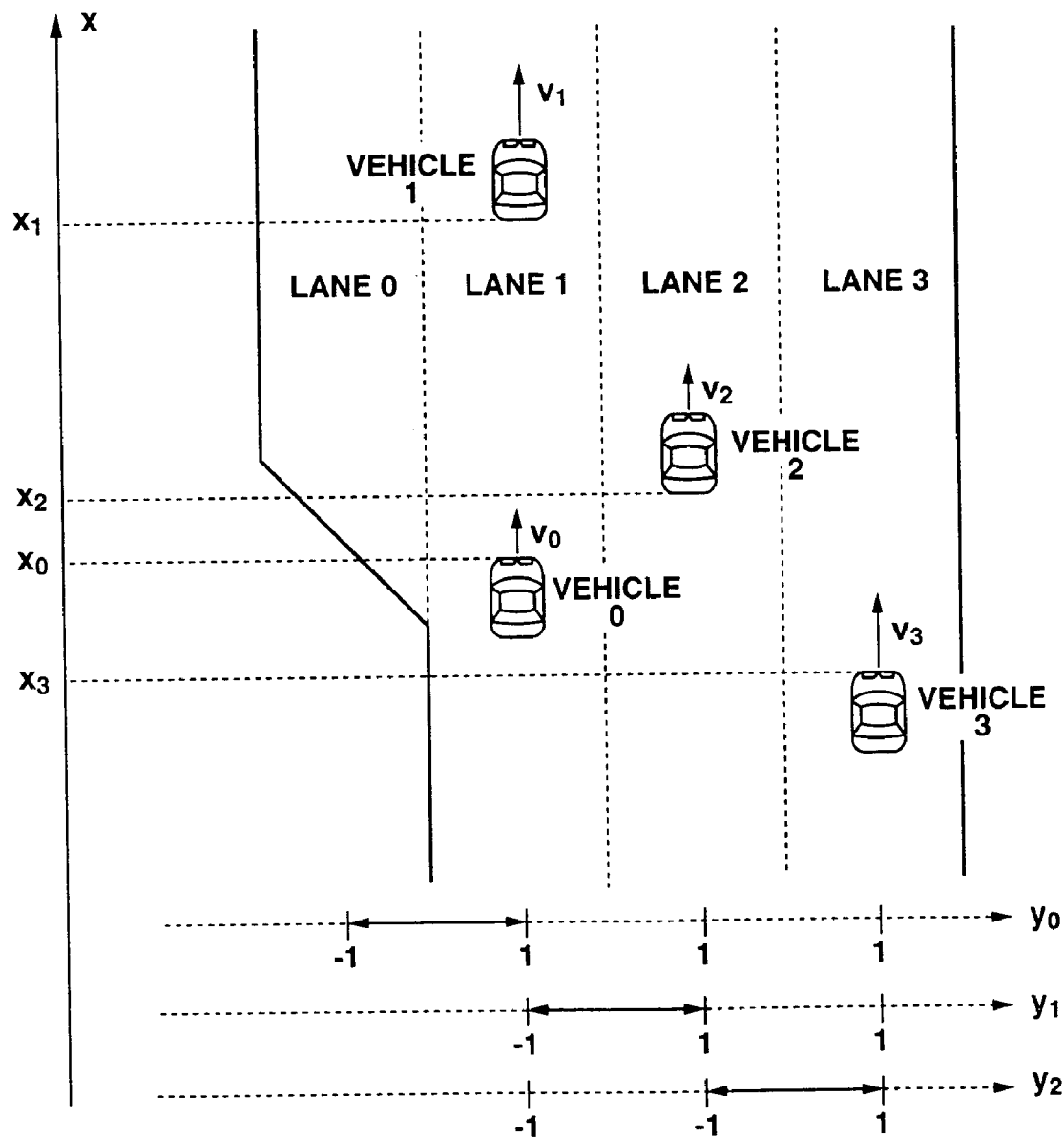
FIG. 9 is a schematic top view of a scene of the application of the second embodiment of the vehicle operator driving assistance improving system shown in FIG. 7.
Figure 10A:
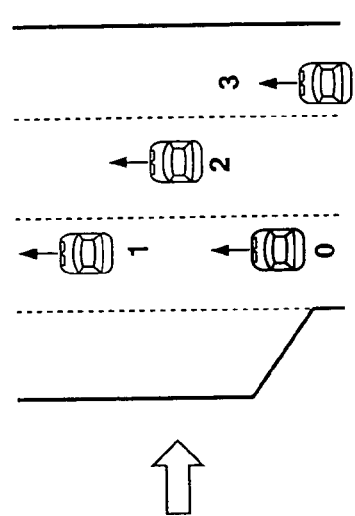
FIGS. 10A, 10B, 10C and 10D, 10E, and 10F are schematic top views of examples (case 1 and case 2) of the results of calculations of the recommended control input in the second embodiment of the vehicle operator driving assistance improving system.
Figure 10B:
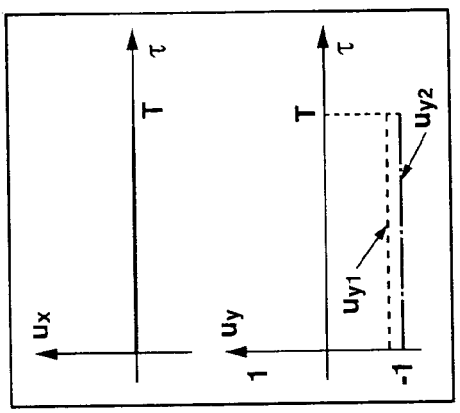
Figure 10C:
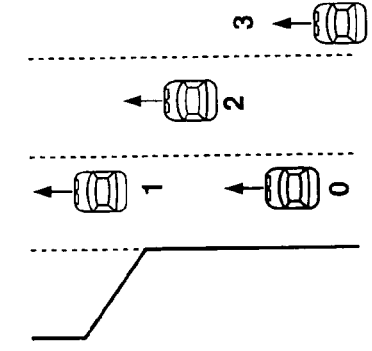
Figure 10D:
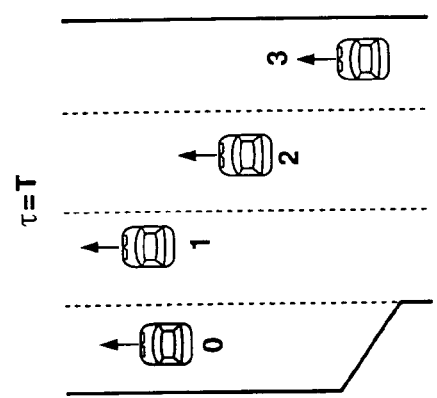
Figure 10E:
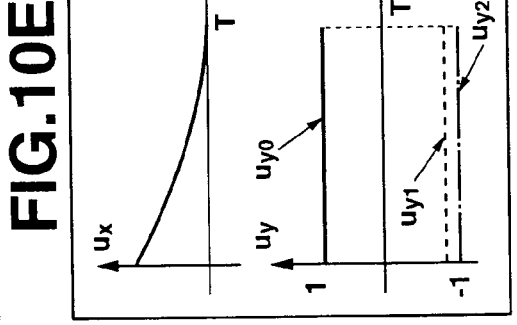
Figure 10F:
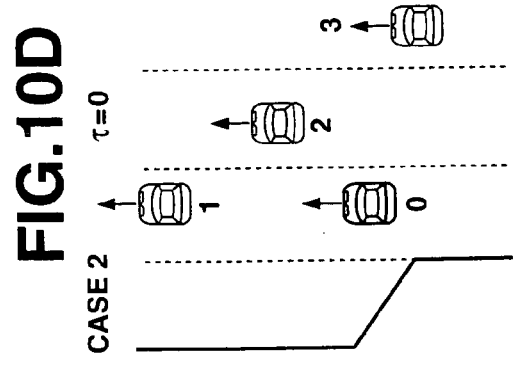

FIGS. 7 through 10F show a second preferred embodiment of the vehicle operator driving assistance improving system. FIG. 7 shows an arrangement of the driving assistance improving system in the second embodiment according to the present invention. A basic structure in the second embodiment is the same as described in the first embodiment shown in FIG. 1. In the second embodiment, a GPS (Global Positioning System) signal receiver 9 and a map data base 10 are added. Along with this addition, the functional block diagram is different as shown in FIG. 8. A basic processing flow in calculating section 3 is the same as shown in FIG. 6 described in the first preferred embodiment. In this embodiment, the operation of the system in a scene in which the number of the traffic lane is increased. FIG. 9 shows a situation in which vehicle 0 is traveling on the left lane of the one-side three-traffic-lanes road, one traffic lane is increased at a leftmost side of the three traffic lanes to form a one-side four-traffic-lanes road, and vehicle 0 is traveling at a point of place at which the road becomes the one-side four-traffic-lanes road. The traffic lanes on the one-side three-traffic-lanes road are called lane 1, lane 2, and lane 3 in the order from the leftmost position as viewed from FIG. 9 and a newly appeared leftmost lane is called lane 0. Suppose that vehicle 1, vehicle 2, and vehicle 3 are traveling at substantially the same speed in front of vehicle 0. The traveling speeds of vehicle 1, vehicle 2, and vehicle 3 are lower than the desired vehicle speed of vehicle 0. Suppose also that each of the other vehicles than vehicle 0 do not make the lane change.

When the increase of the number of traffic lanes at the present position of vehicle 0 is confirmed from GPS receiving signal of GPS signal receiver 9, the collation of information from road map data base 10, and a detection result of image sensor (image processor, viz., traffic lane detector) 1B, trigger signal governing (managing) section 3A generates the trigger signal corresponding to a new traffic lane, the traffic variable, and traffic lane change model. In the one-side three-traffic-lanes road, the trigger signal expressing the lane change between lane 1 and lane 2 is denoted by $u_{y1}$, the trigger signal expressing the lane change between lane 2 and lane 3 is denoted by $u_{y2}$, and their corresponding traffic lane variables are $y_1$ and $y_2$, respectively. In this case, the traffic lane change models are as follows:

$$\dot{y}_1 = -\omega y_1 + \omega u_{y1} \quad (42).$$

$$\dot{y}_2 = -\omega y_2 + \omega u_{y2} \quad (43).$$

A corresponding relationship between each trigger signal (and traffic lane variable) and the corresponding actual traffic lane is as follows:

$$(u_{y1}, u_{y2}) = \begin{cases} (-1, -1) & \rightarrow lane1 \\ (1, -1) & \rightarrow lane2 \\ (1, 1) & \rightarrow lane3 \end{cases} \quad (44)$$

When lane 0 is newly detected from the above-described state of the three lanes on equation (44), a trigger signal $u_{y0}$ expressing the lane change between lane 0 and lane 1 and corresponding traffic lane variable $y_0$ are newly generated and a traffic lane change model expressed in the following equation (45) is newly introduced.

$$\dot{y}_0 = -\omega y_0 + \omega u_{y0} \quad (45).$$

Accordingly, a correspondent relationship between the trigger signal and the actual traffic lane is given as follows:

$$(u_{y0}, u_{y1}, u_{y2}) = \begin{cases} (-1, -1, -1) & lane0 \\ (1, -1, -1) & lane1 \\ (1, 1, -1) & lane2 \\ (1, 1, 1) & lane3 \end{cases} \quad (46)$$

The longitudinal model of vehicle 0 in the surrounding vehicle behavior prediction equation is constituted by equation (2) and those of each of the other models are constituted by equation (5) in the same way as described in the first embodiment.

The evaluation function is modified in accordance with the increase in the number of the traffic lanes. The longitudinal motion evaluation term can utilize the same as equation (17) described above. The speed evaluation term, in the second embodiment, is supposed to be set as in the following equation (47) supposing that the same desired vehicle speeds are set for all traffic lanes.

$$L_v(v_0) = \frac{1}{2}(v_0 - v_d)^2. \quad (47)$$

In equation (47), $v_d$ is assumed to represent the desired traveling vehicle speed of vehicle 0.

The traffic lane evaluation term defines the following equations:

$$L_{Y0}(u_{y0}, y_0) = \frac{1}{2}(u_{y0} - y_0)^2. \quad (48)$$

$$L_{Y1}(u_{y1}, y_1) = \frac{1}{2}(u_{y1} - y_1)^2. \quad (49)$$

$$L_{Y2}(u_{y2}, y_2) = \frac{1}{2}(u_{y2} - y_2)^2. \quad (50)$$

Then, the traffic lane evaluation term is constituted by the following equation (51).

$$L_Y = L_{Y0}(y_{y0}, y_0) + L_{Y1}(u_{y1}, y_1) + L_{Y2}(u_{y2}, y_2) \quad (51).$$

The surrounding vehicle evaluation term is constituted as follows with the evaluation of lane i as Li.

$$L_s = c_L(y_0)L_0 + c_L(y_1)c_R(y_0)L_1 + c_L(y_2)c_R(y_1)L_2 + c_R(y_2)L_3 \quad (52)$$

In equation (52), functions $c_L$ and $c_R$ are connection functions defined in equations (25).

In addition, for evaluation functions of $L_0$ through $L_3$, in a case of a scene shown in FIG. 9, such an evaluation function as equations (53) can be formed.

$$L_0 = 0, \qquad L_i = \left(\frac{v_0}{x_i - x_0}\right)^2 \qquad i = 1, 2, 3. \tag{53}$$

Thus, when the evaluation terms are formed, a whole evaluation equation L can be formed in the exactly same form as equation (33).

As described above, after surrounding vehicle behavior (motion) predicting section 3B and the evaluation function are re-constructed, recommended control input calculating section 3D calculates the recommended control input.

The contents of processing in recommended control input section 3D is generally the same as those in the case of the first embodiment. According to the increase in the number of traffic lanes, the increase of the restriction is involved. This is a difference point in this embodiment from the first embodiment. For example, the restriction of the trigger signal shown in TABLE 1 is modified to that shown in TABLE 2. From among the enabled trigger signals prescribed according to the states of the traffic lane variables, a pattern of the trigger signals which minimizes Hamiltonian is used as a new temporal solution. FIGS. 10A, 10B, and 10C and FIGS. 10D, 10E, and 10F are examples of the recommended control inputs in the scene of FIG. 9. In a case (case 1, FIGS. 10A through 10C) where vehicle 0 is placed in front of the point from which the number of the traffic lanes is increased, the recommended control input such that the present vehicle speed is simply maintained is generated. On the other hand, in a case (case 2, FIGS. 10D through 10F) where vehicle 0 is passing through the point of the road from which the number of traffic lanes is increased, the recommended control input is such that vehicle 0 makes the lane change to lane 0 and is accelerated up to its desired traveling speed.

(Third Embodiment)

FIGS. 11 and 12A through 12C show a scene and operation in a third preferred embodiment of the driving assistance improving system. A basic structure in the driving assistance improving system of the third embodiment is the same as described in the second embodiment. FIG. 7 described in the second embodiment is applicable to the third embodiment and FIG. 8 described in the second embodiment is also applicable to the third embodiment. The processing flow is also the same as that shown in the flowchart of FIG. 6 described in the first embodiment.

Figure 11:
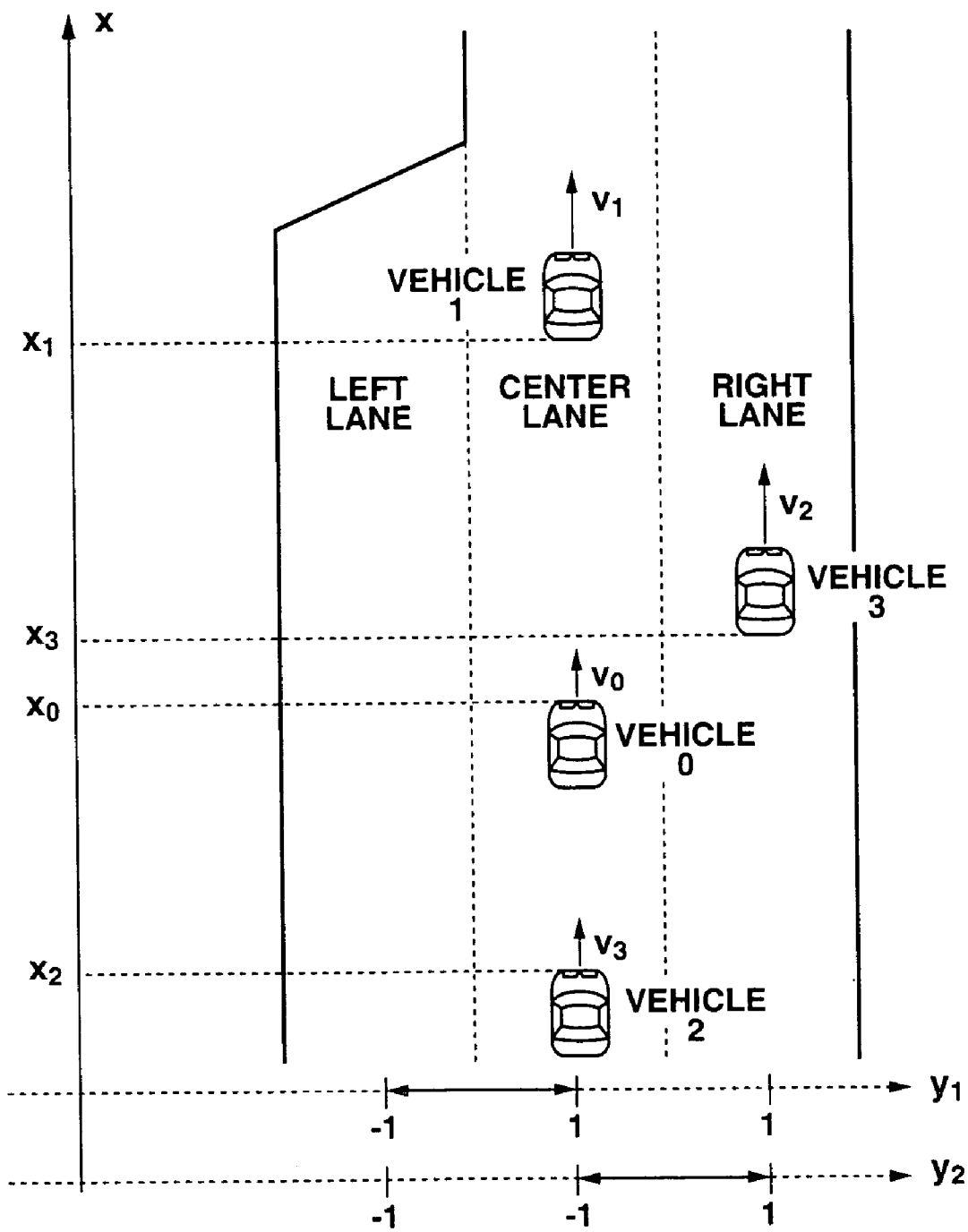
FIG. 11 is a schematic top view representing an example of a scene of the application of the vehicle operator driving assistance improving system in a third preferred embodiment according to the present invention.

FIG. 11 shows the scene in which vehicle 0 is traveling on the center lane of the road of the one-side, three-traffic lanes and the scene in which vehicle 1 is traveling on the front portion of the same center lane, vehicle 2 is traveling in the backward position of (behind) vehicle 0, and vehicle 3 is traveling in the front position of the right traffic lane with respect to vehicle 0. The traveling vehicle speeds of vehicle 1 and vehicle 2 are lower than the desired traveling speed of vehicle 0. In addition, the left side traffic lane joins to the center lane at the forward direction of the left side traffic lane. The number of traffic lanes are, at last, decreased.

In such a scene as described above with reference to FIG. 11, in a trigger signal generating procedure at step S2 in the flowchart of FIG. 6, when the decrease in the traffic lane is detected at the forward direction within a predetermined distance (for example, a distance of about 300 meters), the trigger signal and traffic lane variable related to the vanishing traffic lane are immediately deleted without wait for vehicle 0 to reach to a point of place at which the corresponding lane (the left lane) is not present. If trigger signal $u_{y1}$ and traffic lane variable $y_1$ express the lane change between the left lane and the center lane and trigger signal $u_{y2}$ and traffic lane variable $y_2$ express the lane change between the center lane and the right lane, in the case of the scene in FIG. 11, the trigger signal $u_{y1}$ and traffic lane variable $y_1$ are deleted.

According to such a processing as described above, before the number of the traffic lanes is decreased, the same process as deemed substantially to be decreased is transferred. Hence, a generation of the recommended control input can be suppressed, this recommended control input being such that the vehicle makes the lane change to the traffic lane by which a sufficient traveling distance cannot be secured and which soon vanishes (which is ended). FIGS. 12A through 12C show examples of the recommended control input in the scene of FIG. 11. The recommended control input is carried out in spite of the fact that an empty space is present on the left lane, the lane change to the left traffic lane is not carried out (vehicle 0) and, after vehicle 3 has passed aside vehicle 0, vehicle 0 makes the lane change to right lane. In the third embodiment, as described above, trigger signal governing (managing) section 3A immediately deletes the lane change trigger signal and the traffic lane variable in a case where the detected lane is detected that the detected lane will vanish in the forward direction within the predetermined distance from the position of the present vehicle 0 and in a case where vehicle 0 is not traveling on the vanishing traffic lane and corrects (modifies) the evaluation function in such a way that such a recommended control input as to promote the lane change to the adjacent lane in a case where vehicle 0 is traveling on a vanishing traffic lane.

As described above, since the generation of the recommended control input such as to promote the lane change to the immediately vanishing lane can be suppressed by deleting the trigger signal and traffic lane variable corresponding to the vanishing lane in the forward direction of vehicle 0 before the lane actually vanishes. A sense of incompatibility given to the driver by recommending the lane change to the lane that soon vanishes can be suppressed.

In addition, in a case where vehicle 0 is traveling the vanishing lane, the recommended control input can be generated to promote the lane change to inform the driver of the necessity of the lane change as soon as possible.

(Fourth Embodiment)

Figure 13:
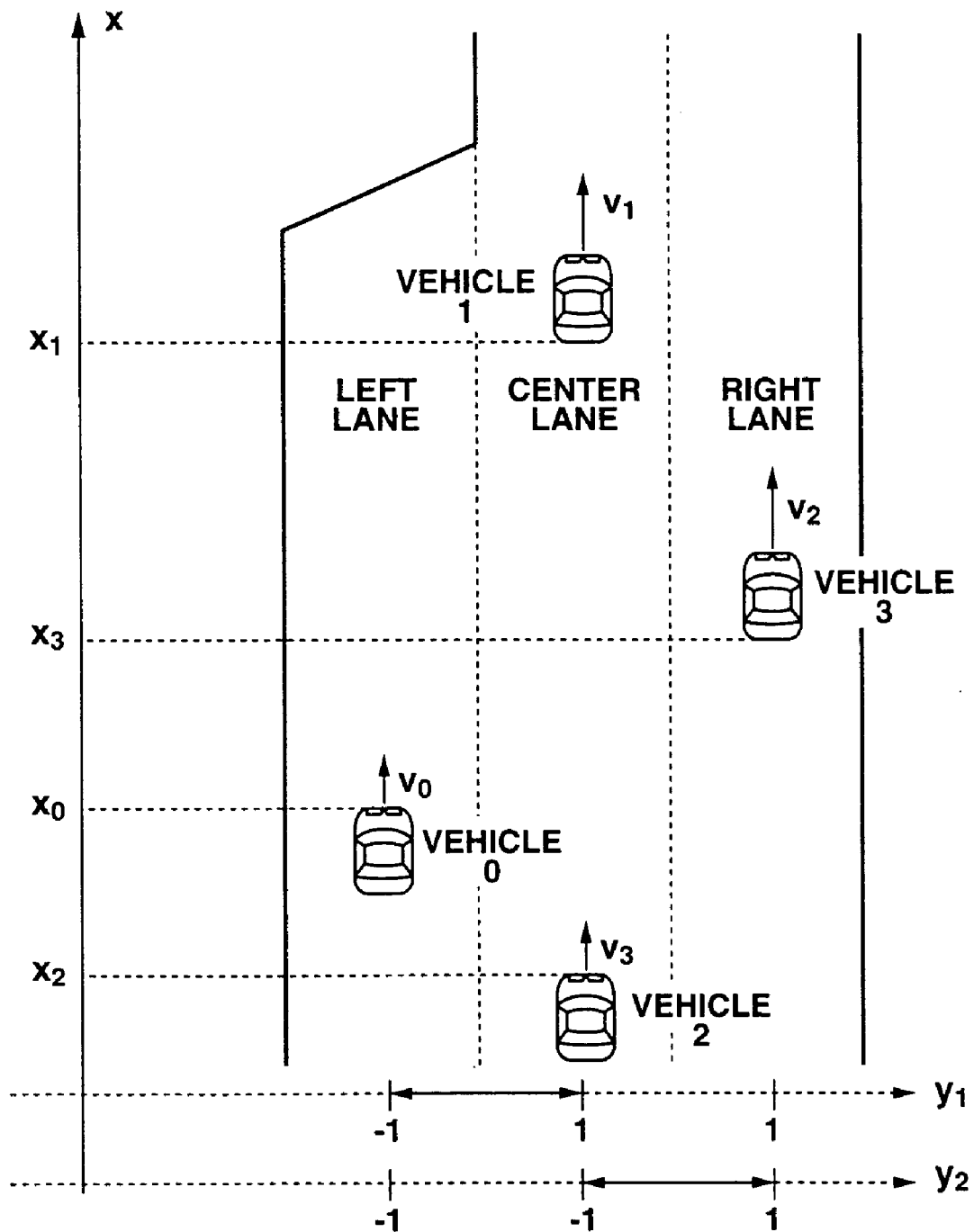
FIG. 13 is a schematic top view of a scene of an example of the application of the vehicle operator driving assistance improving system in a fourth preferred embodiment according to the present invention.

A fourth preferred embodiment of the driving assistance improving system will be described with reference to FIGS. 13 through 15C. A basic structure of the driving assistance improving system in the fourth embodiment is the same as in the case of the third embodiment. The arrangement shown in FIG. 7 and the structural view of FIG. 8 are the same. The fourth embodiment has centered on an operation of the system in a scene where the number of traffic lanes is decreased. A difference point from the system in the third embodiment, the lane vanishes in the forward direction on the lane on which vehicle 0 is traveling (refer to FIG. 13). In this case, the scene shown in FIG. 13 is supposed. In FIG. 13, vehicle 0 is traveling on the left lane of the one-side three-traffic-lanes road, vehicle 1 is traveling on the front side of the center lane, vehicle 2 is traveling on the backward position of vehicle 0 traveling on the center lane. Vehicle 3 is traveling on the front position of the right lane with respect to vehicle 0 at the center lane. The left traffic lane is joined to the center lane at the forward direction of vehicle 0 so that the number of lanes are accordingly decreased. In the fourth embodiment, trigger signal $u_{y1}$ and traffic lane variable $y_1$ express the lane change between left lane and center lane and trigger signal $u_{y2}$ and traffic lane change variable $y_2$ expresses the lane change between right lane and the center lane. In the case of FIG. 13, vehicle 0 cannot be left on the present lane. It is necessary to make the lane change before the traveling traffic lane is vanished. Hence, if the lane width reduction is detected (for example, about 300 meters) ahead of the point of the decrease in the number of lanes, the evaluation function is corrected (modified) so as to make the lane change to the center lane easily and the recommended control input is generated to promote the lane change. Thus, the recommended control input is governed. Consequently, the necessity of the lane change to the driver is informed. In this embodiment, the correction is made for the evaluation terms of the longitudinal motion evaluation term and traffic lane change evaluation term. Hence, the evaluation function which is easy to make the lane change is constructed. For the longitudinal motion evaluation term, the weighting coefficient in the left lane is set to be smaller than each of the weighting coefficients on the center lane and right traffic lane. Thus, the longitudinal motion along the lane change can more freely be carried out. Specifically, the weighting coefficient for the left lane is set to be $w_{x1}$, the weighting coefficient for center lane and right lane is set to be $w_{x2}$. The longitudinal motion evaluation term including the weighting coefficient is reconstructed as described below:

$$L_x(u_x, y_1) = \frac{1}{2}(w_{X1}c_L(y_1) + w_{X2}c_R(y_1))u_x^2. \tag{54}$$

For the traffic lane evaluation term, at the same time when the weighting coefficient to the evaluation term is made small so that trigger signal $u_{y1}$ is made easy to be varied. At the same time, a new term such that the evaluation to $u_{y1}=1$ is made smaller than the evaluation to the $u_{y1}=1$ is newly introduced so that an evaluation function which is easy to make the lane change to the right traffic lane is constructed. Specifically, such an equation as expressed below can be considered.

$$L_Y = \frac{w_{Y1}}{2}(u_{y1} - y_1)^2 + \frac{w_{Y2}}{2}(u_{y2} - y_2)^2 - w_{UY1}u_{y1}. \tag{55}$$

The surrounding vehicle evaluation term and speed evaluation term can be constructed in accordance with those described in each of the second and third embodiments. Thus, the whole evaluation equation is constructed as follows:

$$L(\tau) = L_x + L_Y + w_s L_s + w_v L_v \tag{56}.$$

At this time, any terms from among the Hamiltonian defined in equation (35) that are related to trigger signal $u_{y1}$ are extracted (picked-up). That is to say, $$H = \cdots + (\omega\lambda_3 - w_{Y1}y_1 - w_{UY1})u_1 + \frac{w_{Y1}}{2}u_1^2 + \cdots. \tag{57}$$

Hence, when vehicle 0 is present on the left lane (when $y_1=-1$), a condition that the trigger signal $u_{y1}=1$ to command the driver to make the lane change to the center lane is given as follows:

$$\omega\lambda_3 - w_{Y1}y_1 - w_{UY1} < 0 \tag{58}.$$

Hence, as $w_{Y1}$ is made smaller and as $w_{UY1}$ is made larger, such a recommended control input calculation rule as to make the easier lane change to the center lane can be established. It is noted that the processing contents of recommended control input calculating section 3D is the same as described in the first embodiment.

Figure 14:
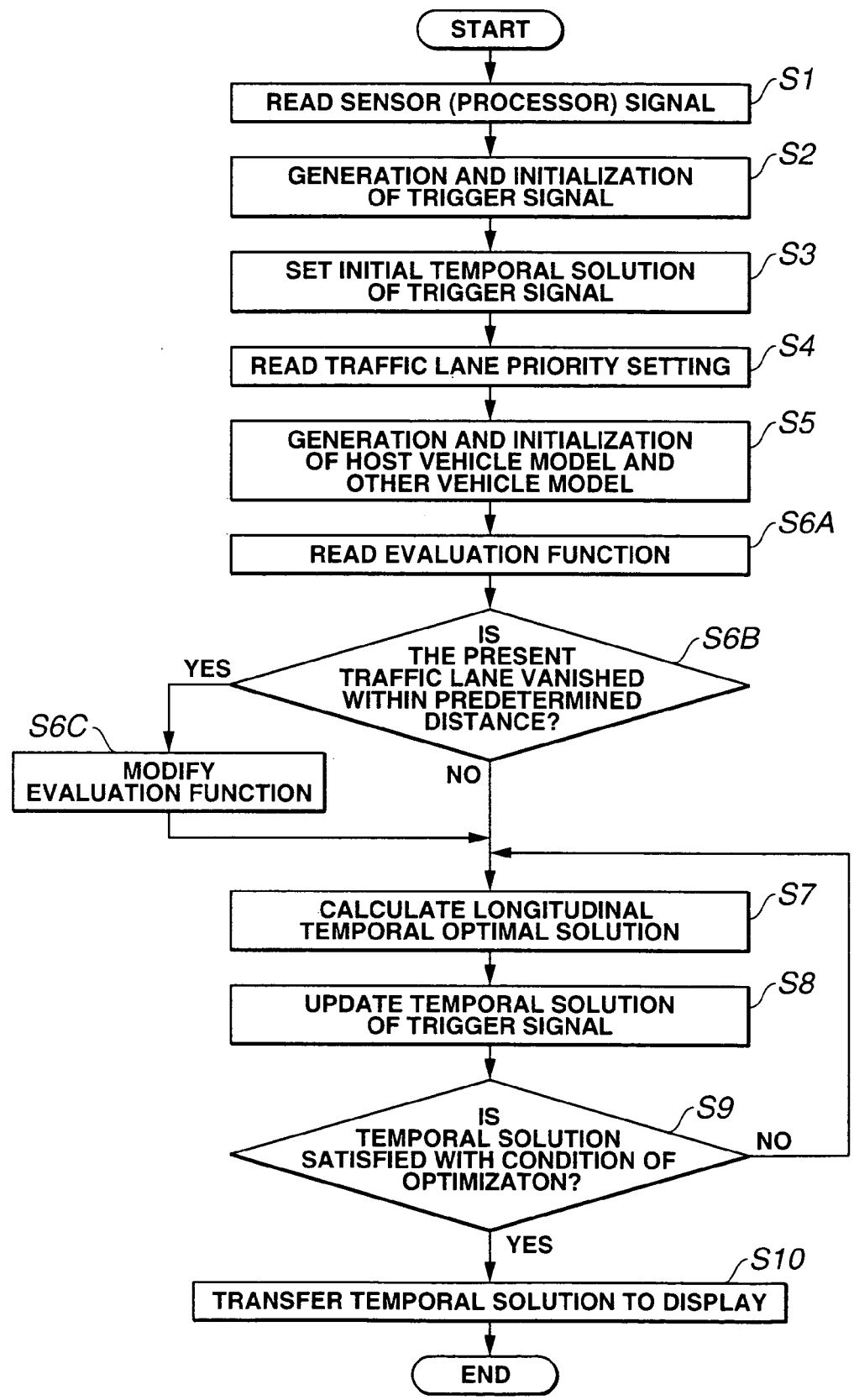
FIG. 14 is an operational flowchart representing of the processing procedure executed in a fourth preferred embodiment according to the present invention.

Since, in this embodiment, a switching process of the evaluation function is included, the processing flowchart in the fourth embodiment is modified as shown in a flowchart of FIG. 14.

At step S1, calculating section 3 reads each signal of surrounding sensors 1A through 1D of surrounding vehicle detecting section 6 and each signal of vehicular speed sensor 2 of vehicular state detecting section 7. At this time point, calculating section 3 calculates each speed of the other vehicles surrounding vehicle 0 including vehicle 0 and the relative positions between vehicle 0 and surrounding vehicle to calculate vector X as described in equation (13).

At step S2, calculating section 3 generates the lane change trigger signals, the trigger signal corresponding traffic lane variables, and traffic lane change models associated with both of the trigger signals and the lane variables by a required number according to the detected number of traffic lanes, executes the initialization of the initial value setting and the parameter setting. At step S3, the initial temporal solutions of the trigger signals $u_{y1}$ and $u_{y2}$ are appropriately generated. For example, the initial temporal solution such as to command the driver to maintain the position of the traffic lane on which vehicle 0 is traveling without change. At step S4, calculating section 3 reads the setting of traveling lane priority order specifying section 3E and assigns the priority order to each of the detected traffic lanes.

At step S5, calculating section 3 generates the longitudinal model of vehicle 0 and the models for the other vehicles. Specifically, equation (2) is generated as the longitudinal model of vehicle 0, and the model of equation (5) for each detected other vehicle is generated. Each model is initialized. At a step 6A, calculating section 3 reads the preset evaluation function for a normal (ordinary) driving of the vehicle. At a step S6B, calculating section 3 carries out the information collation with the information from GPS received signal from GPS signal receiver 9, the information of road map data base 10, and the present traffic lane position of vehicle 0 and determines whether the lane on which vehicle 0 is traveling will soon vanish within the predetermined distance. If Yes at step S6B, the routine goes to a step S6C. At step S6C, calculating section 3 reads the evaluation function set during the normal traveling and reconstructs the evaluation function having a characteristic such that it is easy to make the lane change. Then, the routine goes to step S7. If the traveling lane does not vanish (No) at step S6B, the routine directly jumps to step S7. At step S7, calculating section 3 solves the optimization problem through an appropriate technique using temporal solutions of the set trigger signals $u_{y1}$ and $u_{y2}$ and calculates the optimal solution in the longitudinal direction $u_x^*$ and solution $X^*$ and $\ddot{e}^*$ its corresponding two-point boundary-value problem.

At step S8, calculating section 3 updates temporal solutions of trigger signals $u_{y1}$ and $u_{y2}$ on the basis of solutions of $X^*$ and $\ddot{e}^*$ derived at step S7 to obtain new temporal solutions $u_{y1}^*$ and $u_{y2}^*$.

At step S9, calculating section 3 checks to see if longitudinal optimal solution $u_x^*$ derived at step S7 and temporal solutions of $u_{y1}^*$ and $u_{y2}^*$ derives at step S8 satisfy the optimality conditions of equations (36) through (38). If Yes (satisfies) at step S9, the routine goes to step S10 at which $u_x^*$, $u_{y1}^*$, and $u_{y2}^*$ at the instantaneous time are ascertained as the recommended control inputs and are transferred to display 4 and the processing routine shown in FIG. 14 is ended. If does not satisfy (No) at step S9, the instantaneous $u_x^*$, $u_{y1}^*$, and $u_{y2}^*$ are set as temporal solutions and the routine returns to step S7 to calculate new temporal solutions.

FIGS. 15A through 15C integrally show an example of recommended control inputs in the scene of FIG. 13 described above. As shown in FIGS. 15A through 15C, such a recommended control input is generated that vehicle 0 is immediately accelerated to widen the inter-vehicle distance to vehicle 2 so that vehicle 0 makes the lane change to the center lane. It is noted that, in a case where the driver drives vehicle 0 actually in accordance with the recommended control input and makes the lane change to the center lane, this results in the same scene as described in the third embodiment. Hence, at a time point at which trigger signal $u_{y1}$ and traffic lane variable $y_1$ are deleted and, thereafter, the recommended control input is continued to be generated assuming that the left lane is thereafter not present. It is noted that the recommended control input calculating section 3D corresponds to a recommended operation indicator, the recommended control input has the same meaning, in the whole specification, as each of the lane change trigger signals, and evaluation function structural section corresponds to an evaluation function calculator.

Various changes and modifications may be made without departing from the spirit and scope of the present invention which is to be defined in the appended claims.

The entire contents of a Japanese Patent Application No. 2002-338289 (filed in Japan on Nov. 21, 2002) are herein incorporated by reference. The scope of the invention is defined with reference to the following claims.

TABLE 1

Restriction on trigger signal

| State of traffic lane variables | Determination on lane position | Enabled trigger signal $(u^*_L, u^*_R)$ |
|---|---|---|
| $y^*_R = -1$ $y^*_L < 0$ | Left lane | (-1, -1) (1, -1) |
| $y^*_R < 0$ $y^*_L > 0$ | Center lane | (-1, -1) (1, -1) (1, 1) |
| $y^*_R > 0$ $y^*_L = 1$ | Right lane | (1, -1) (1, 1) |

TABLE 2

Restriction on trigger signal in a four-traffic-lanes road

| State of traffic lane variables | Determination on lane position | Enabled trigger signal $(u^*_L, u^*_R)$ |
|---|---|---|
| $y^*_0 < 0$ $(y_1, y_2) = (-1, -1)$ | Lane 0 | (-1, -1, -1) (1, -1, -1) |
| $y^*_0 > 0, y^*_1 < 0$ $y_2 = -1$ | Lane 1 | (-1, -1, -1) (1, -1, -1) (1, 1, -1) |
| $y^*_1 > 0, y^*_2 < 0$ $y_0 = 1$ | Lane 2 | (-1, -1, -1) (1, 1, -1) (1, 1, 1) |
| $y^*_2 > 0$ $(y_0, y_1) = (1, 1)$ | Lane 3 | (1, 1, -1) (1, 1, 1) |

What is claimed is:

1. A system for improving vehicle operator driving assistance of an automotive vehicle, the system comprising:
a surrounding vehicle sensor that detects other surrounding vehicle conditions;
a host vehicle condition sensor that detects the host vehicle own conditions;
a lane sensor that detects positions and numbers of forward lanes;
a surrounding vehicle motion predictor that predicts future movement of the surrounding vehicle;
an evaluation function calculator that calculates a desirableness of a vehicle operator's driving operation;
a recommended operation indicator that indicates acceleration timing and magnitude and a lane change timing with a desirable lane for the host vehicle from outputs of the surrounding vehicle motion predictor and the evaluation function calculator; wherein the recommended operation indicator calculates a lane change necessity and produces a lane change trigger signal while the host vehicle is operated on a road that has at least three lanes; and wherein the recommended operation indicator also prohibits to indicate a new lane change trigger signal until a forward lane change operation is deemed to be completed.

2. The system for improving vehicle operator driving assistance of an automotive vehicle as claimed in claim 1, wherein the system further comprises: a trigger signal governing section that generates and deletes time series lane change trigger signals in such a manner that a single traffic lane change trigger signal is allocated to each couple of two mutually adjacent lanes from among the detected lanes; and a trigger signal restricting section that places a limitation on a value that each lane change trigger signal is enabled to take according to a predicted state of one of the traffic lanes on which the vehicle is to travel predictively calculated by the surrounding vehicle motion predictor.

3. The system for improving vehicle operator driving assistance of an automotive vehicle as claimed in claim 2, wherein the system further includes a traffic lane traveling priority order specifying section that specifies a traveling priority order to each of the detected lanes and wherein the trigger signal restricting section imposes on the recommended operation indicator a restriction such that each lane change trigger signal is calculated and outputted to promote the lane change to a higher priority order specified lane of the road when, during the calculation of the lane change necessity by the recommended operation indicator, such an evaluation that a desirableness of the lane change to a left lane with respect to the lane on which the vehicle is traveling is equal to the desirableness of the traffic lane change to a right lane with respect to the lane on which the vehicle is traveling and it is desirable to make the lane change rather than not to make the lane change is outputted.

4. The system for improving vehicle operator driving assistance of an automotive vehicle as claimed in claim 3, wherein the trigger signal restricting section imposes another restriction on the recommended control operation indicator, the other restriction being such that a modification of the traffic lane change trigger signal which is not associated with one of the traffic lanes on which the vehicle is traveling or on which the vehicle is predicted to travel.

5. The system for improving vehicle operator driving assistance of an automotive vehicle as claimed in claim 1, wherein each lane change trigger signal is defined as a signal which takes only two ways of a value corresponding to the left lane and of another value corresponding to the right lane and wherein the surrounding vehicle motion predictor includes a traffic lane change model that inputs each of the time series lane change trigger signals and outputs a traffic lane variable which takes two ways of values defined as the two values corresponding to the left lane and right lane and an arbitrary continuous value which is intermediate between the two values, the traffic lane variable following a variation of one of the traffic lane change trigger signals which corresponds to the one of the lane change trigger signal.

6. The system for improving vehicle operator driving assistance of an automotive vehicle as claimed in claim 5, wherein the trigger signal restricting section imposes a further another restriction on the recommended operation indicator, the further another restriction being such that, when one couple of the lane change trigger signals and the corresponding lane variable is at least present in which a deviation between the values of one of the lane change trigger signals and of the corresponding lane variable is larger than a predetermined value, a modification of the lane change trigger signals is inhibited.

7. The system for improving vehicle operator driving assistance of an automotive vehicle as claimed in claim 5, wherein the evaluation function in the evaluation function calculator includes: a surrounding vehicle evaluation term that evaluates at least one of relative positional relationships between the vehicle and the other surrounding vehicles and relative velocity relationships therebetween; and a longitudinal motion evaluation term that evaluates a longitudinal motion of the vehicle, and wherein the surrounding vehicle evaluation term includes respective lane evaluation terms that evaluates a relative positional relationship between the host vehicle and each of the other surrounding vehicles present on the respective traffic lanes; a left connection function which is a function to map the lane variable on a closed interval with zero and a real number value as both ends of the closed interval and to map a value of the lane variable corresponding to the left lane onto zero; and a right connection function which is a function to map the lane variable on the closed interval with zero and the real number value as both ends of the closed interval and to map a value of the lane variable corresponding to the right lane onto zero and the surrounding vehicle evaluation term is constituted by calculating a product between the left connection function with one of the lane variables which is made correspondent to the left lane as an input variable thereof and the right connection function with one of the traffic lane variables which is made correspondent to the right lane as the input variable thereof for each of the traffic lane evaluation terms and by adding together the term of the product calculated for each traffic lane.

8. The system for improving vehicle operator driving assistance of an automotive vehicle as claimed in claim 7, wherein each of the left and right connection functions is a differentiable monotone increasing or decreasing function and a differential coefficient of a domain of definition is not zeroed.

9. The system for improving vehicle operator driving assistance of an automotive vehicle as claimed in claim 7, wherein the longitudinal motion term is constituted by a term of evaluating a longitudinal motion of the vehicle when the vehicle is present on each of the detected traffic lanes and by producing a product between the left connection function with the traffic lane variable in which the corresponding traffic lane is made correspondent to the left lane and the right connection function with the lane variable in which the corresponding traffic lane is made correspondent to the right lane and adding each term of the products obtained for each of the detected traffic lanes.

10. The system for improving vehicle operator driving assistance of an automotive vehicle as claimed in claim 7, wherein the evaluation function includes a vehicle speed evaluation term that evaluates a speed of the vehicle and the vehicle speed evaluation term is constituted by a term that evaluates the speed of the vehicle when the vehicle is traveling on each traffic lane and by calculating a product between the left connection function with the traffic lane variable in which the corresponding traffic lane is made correspondent to the left lane and the right connection function with the traffic lane variable in which the corresponding traffic lane is made correspondent to the right lane and adding together each term of the product obtained for each of the detected traffic lanes.

11. The system for improving vehicle operator driving assistance of an automotive vehicle as claimed in claim 1, wherein the trigger signal governing section, when at least one of the traffic lanes which soon vanishes in front of the present position of the vehicle within a predetermined distance from the present position of the vehicle, immediately deletes the corresponding lane change trigger signal and corresponding traffic lane variable related to the traffic lane which soon vanishes when the vehicle is traveling on another lane than the one of the traffic lanes which soon vanishes.

12. The system for improving vehicle operator driving assistance of an automotive vehicle as claimed in claim 2, wherein the trigger signal governing section, when at least one of the traffic lanes which soon vanishes in front of the present position of the vehicle within a predetermined distance from the present position of the vehicle, modifies the evaluation function to calculate the necessity of the lane change and the lane change trigger signal to promote the traffic lane change to one of the traffic lanes adjacent to the one of the traffic lanes when the vehicle is traveling on the one of the traffic lanes which soon vanishes.

13. The system for improving vehicle operator driving assistance of an automotive vehicle as claimed in claim 1, wherein each of the time series lane change trigger signals is generated from input variables of the evaluation function which minimize the evaluation function.

14. The system for improving vehicle operator driving assistance of an automotive vehicle as claimed in claim 7, wherein the recommended operation indicator determines the necessity of the lane change for each adjacent traffic lane on the basis of the lane evaluation term of the evaluation function.

15. The system for improving vehicle operator driving assistance of an automotive vehicle as claimed in claim 1, wherein each of the time series lane change trigger signals calculated by the recommended operation indicator is transferred to a display mounted in the vehicle.

16. A system for improving vehicle operator driving assistance of an automotive vehicle, the system comprising:

surrounding vehicle detecting means for detecting other surrounding vehicle conditions;
host vehicle state detecting means for detecting the host vehicle own conditions;
lane detecting means for detecting positions and numbers of forward lanes;
surrounding vehicle motion predicting means for predicting future movements of the surrounding vehicles;
evaluation function calculating means for calculating a desirableness of a vehicle operator's driving operation;
recommended operation indicating means for indicating acceleration timing and magnitude and a lane change timing with a desirable lane for the host vehicle from outputs of the surrounding vehicle motion predictor and the evaluation function calculator; wherein the recommended operation indicating means calculates a lane change necessity and produces a lane change trigger signal while the host vehicle is operated on a road that has at least three lanes; and wherein the recommended operation indicating means also prohibits to indicate a new lane change trigger signal until a forward lane change operation is deemed to be completed.

17. A method for improving vehicle operator driving assistance of an automotive vehicle, the system comprising:

detecting other surrounding vehicle conditions;
detecting the host vehicle own conditions;
detecting positions and numbers of forward lanes;
predicting future movements of the surrounding vehicles;
calculating a desirableness of a vehicle operator's driving operation;
indicating acceleration timing and magnitude and a lane change timing with a desirable lane for the host vehicle from outputs at the prediction of the future movements of the surrounding vehicles and at the evaluation function calculation; wherein, at the indication of the acceleration timing and magnitude and the lane change timing, a lane change necessity is calculated and a lane change trigger signal is produced while the host vehicle is operated on a road that has at least three lanes and wherein, at the calculation of the lane change necessity and at the production of the lane change signal, a new lane change trigger signal is prohibited to indicate until a forward lane change operation is deemed to be completed.

* * * * *